US011146624B2

(12) United States Patent
Kona

(10) Patent No.: US 11,146,624 B2
(45) Date of Patent: Oct. 12, 2021

(54) REAL TIME MULTI-TENANT WORKLOAD TRACKING AND AUTO THROTTLING

(71) Applicant: MICROSOFT TECHNOLOGY LICENSING, LLC, Redmond, WA (US)

(72) Inventor: Kalyan K. Kona, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/592,720

(22) Filed: Oct. 3, 2019

(65) Prior Publication Data

US 2021/0105317 A1 Apr. 8, 2021

(51) Int. Cl.
*G06F 13/00* (2006.01)
*H04L 29/08* (2006.01)
(Continued)

(52) U.S. Cl.
CPC ...... *H04L 67/1008* (2013.01); *H04L 43/0876* (2013.01); *H04L 47/29* (2013.01);
(Continued)

(58) Field of Classification Search
CPC ............ H04L 67/1008; H04L 67/1021; H04L 67/101; H04L 43/0876; H04L 47/781; H04L 47/29; H04L 67/2842
(Continued)

(56) References Cited

U.S. PATENT DOCUMENTS

| 7,512,702 B1 * | 3/2009 | Srivastava | H04L 45/00 370/236 |
|---|---|---|---|
| 7,895,353 B2 * | 2/2011 | Jansson | H04L 47/10 709/232 |

(Continued)

OTHER PUBLICATIONS

"Azure SQL Database DTU Calculator", Jun. 11, 2019, 3 Pages.
(Continued)

*Primary Examiner* — Kenneth R Coulter
(74) *Attorney, Agent, or Firm* — Newport IP, LLC; David W. Foster

(57) ABSTRACT

Technologies are disclosed for real-time workload tracking and throttling within a multi-tenant service. Multi-tenant services receive requests from computing devices associated with different tenants. While processing requests, the multi-tenant service itself sends requests to an underlying resource, such as a database. Requests from computing device associated with an overactive tenant may cause the multi-tenant service to overwhelm the underlying resource. The overwhelmed underlying resource may not know which tenant a request received by the underlying resource is associated with, and so the underlying resource is unable to only throttle requests originating from computing devices associated with the overactive tenant. Instead, the underlying resource throttles all requests from the multi-tenant service. To avoid this result, the multi-tenant service tracks utilization of the underling resource associated with each tenant, and throttles requests received from overactive tenants before the underlying resource becomes overwhelmed and throttles all requests from the multi-tenant service.

20 Claims, 21 Drawing Sheets

(51) Int. Cl.
  H04L 12/26 (2006.01)
  H04L 12/801 (2013.01)
  H04L 12/911 (2013.01)
(52) U.S. Cl.
  CPC .......... *H04L 47/781* (2013.01); *H04L 67/101* (2013.01); *H04L 67/1021* (2013.01); *H04L 67/2842* (2013.01)
(58) Field of Classification Search
  USPC ........ 709/230–235, 224, 225, 229, 217–219, 709/201
  See application file for complete search history.

(56) References Cited

U.S. PATENT DOCUMENTS

| | | | |
|---|---|---|---|
| 7,933,985 B2 | 4/2011 | Kurapati et al. | |
| 8,190,593 B1 | 5/2012 | Dean | |
| 8,782,224 B2* | 7/2014 | Pijewski | G06F 9/5083 709/203 |
| 9,094,262 B2 | 7/2015 | Hueter et al. | |
| 9,185,006 B2* | 11/2015 | Uluderya | H04L 67/1008 |
| 9,405,597 B1 | 8/2016 | Luff et al. | |
| 2009/0219940 A1* | 9/2009 | Jansson | H04L 47/2433 370/401 |
| 2012/0143992 A1 | 6/2012 | Salamatov et al. | |
| 2012/0233313 A1* | 9/2012 | Fukami | G06F 9/5022 709/224 |
| 2013/0254407 A1* | 9/2013 | Pijewski | H04L 29/08189 709/226 |
| 2014/0173092 A1* | 6/2014 | Uluderya | H04L 67/1008 709/224 |
| 2016/0182328 A1 | 6/2016 | Bhasin et al. | |
| 2016/0212060 A1* | 7/2016 | Holcombe | H04L 67/2842 |
| 2018/0181390 A1 | 6/2018 | Lepcha et al. | |

OTHER PUBLICATIONS

"Microservices Architecture on Google App Engine", Oct. 27, 2018, 6 Pages.
"Service Metering Guidance", Aug. 26, 2015, 7 Pages.
"Throttle API Requests for Better Throughput", May 30, 2019, 4 Pages.
Bennage, et al., "Throttling Pattern", Jun. 23, 2017, 7 Pages.
Carriero, Simone, "Multi-Tenancy and Fairness in the Context of Microservices. An Introduction to the Concept of Sharded Queue", Mar. 13, 2019, 7 Pages.
Dhall, Rohit, "Microservices Performance Patterns", Feb. 22, 2016, 4 Pages.
Phillips, Chris, "Go Full Throttle: The Essentials of Throttling in Your Application Architecture", May 31, 2017, 8 Pages.
Pye, Ian, "Metrics for Microservices: Monitoring Distributed Systems Is Hard", Jan. 28, 2016, 4 Pages.
"International Search Report and Written Opinion Issued in PCT Application No. PCT/US20/046724", dated Nov. 9, 2020, 14 Pages.

* cited by examiner

THROTTLED TENANT TABLE 514

| TENANT IDENTIFIER 602 | THROTTLE STATE 604 | TIMESTAMP 606 |
|---|---|---|
| TENANT 108A | NONE | 08-29-19 @ 4:13PM |
| TENANT 108B | SOFT | 08-29-19 @ 4:16PM |
| TENANT 108C | HARD | 08-29-19 @ 4:12PM |
| TENANT 108D | NONE | 07-14-19 @ 7:43PM |
| TENANT 108E | NONE | 08-29-19 @ 1:03PM |
| TENANT 108F | SOFT | 05-09-18 @ 2:53AM |
| TENANT 108G | NONE | 08-29-19 @ 4:15PM |
| ... | ... | ... |

Row 608A, Row 608B, Row 608C, Row 608D, Row 608E, Row 608F, Row 608G

| Tenant Identifier 702 | Usage Metrics 516A | | | | | |
| --- | --- | --- | --- | --- | --- | --- |
| | SQL Query Count 704 | SQL Query Duration 706 | Network Connection Usage 708 | CPU Usage 710 | Memory Usage 712 | Grid Transaction Units (GTUs) 714 |
| Tenant 108A | 36 | 45ms | 12 | 58ms | 42MB | 685 |
| Tenant 108B | 745 | 124ms | 321 | 4,283ms | 54MB | 468 |
| Tenant 108C | 34,987 | 50,867ms | 98 | 43,385ms | 63MB | 78,966 |
| Tenant 108D | 85 | 27ms | 647 | 83ms | 64MB | 683 |
| Tenant 108E | 135 | 25,321ms | 278 | 167ms | 57MB | 855 |
| Tenant 108F | 7745 | 4,489ms | 146 | 20,312ms | 42MB | 4,768 |
| Tenant 108G | 9 | 2ms | 874 | 4ms | 38MB | 63 |
| ... | ... | ... | ... | ... | ... | ... |

Usage Metrics 516B

Usage Metrics 516C

TENANT 108A | TENANT 108B | ROGUE TENANT 108C | TENANT 108D | TENANT 108E

SERVICE 110A

THROTTLED TENANT TABLE 514

| TENANT IDENTIFIER 108 | THROTTLE STATE 604 |
|---|---|
|  |  |

USAGE METRICS 516A

| TENANT IDENTIFIER 602 | SQL QUERY COUNT 704 | ... | GRID TRANSACTION UNITS (GTUs) 714 |
|---|---|---|---|
| TENANT 108A | 3 |  | 23 |

DATABASE RESPONSES (X3) 808A

UNDERLYING RESOURCE – SQL DATABASE 112A

FIG. 8C

REAL TIME MULTI-TENANT WORKLOAD TRACKING AND AUTO THROTTLING

BACKGROUND

Fairness and reliability are ongoing technological challenges for multi-tenant network services. A tenant may refer to a corporate, government, or non-profit entity, or any other collection of individuals that use a multi-tenant network service (hereinafter 'service'). Fairness may refer to granting equal or near-equal access to each tenant. Reliability may be measured as an uptime percentage and may depend on many factors including whether one tenant can cause the entire service to stop functioning.

A network service is a software component made available over a network. Single tenant services, in which each deployment serves a single tenant, are inherently fair because there are no other tenants competing for resources. Single tenant services are also more reliable, as one tenant is not vulnerable to failures caused by another.

Multi-tenant deployments, in which each deployment serves multiple customers, have several advantages compared to single tenant deployments. While single tenant deployments are typically over-provisioned to account for infrequent periods of large demand—capacity that is otherwise wasted—multi-tenant deployments share resources across tenants, increasing resource utilization efficiency. Multi-tenant deployments also share administrative overhead and electricity costs, further reducing the per-tenant cost to operate the service.

However, multi-tenant network services are prone to over-allocating resources to one tenant, which can result in an under-allocation of resources to other tenants. This lack of fairness causes a poor experience for the under-allocated tenants.

Furthermore, an overactive tenant may cause a service to overwhelm an underlying resource such as a database. The underlying resource may respond by throttling the service. Throttling may refer to limiting a number, rate, or percentage of requests that the underlying resource will process, up to and including not processing any requests from the throttled service. Applications associated with other tenants that attempt to use the throttled service may stall, crash, or otherwise perform less reliably. In some cases, the overwhelmed resource and/or the throttled service may cause a cascade of errors throughout a distributed system, requiring a complete restart. As a result, some or all tenants of the service may experience downtime, loss of data, and less efficient computing.

In some configurations, the underlying resource cannot throttle individual tenants because the underlying resource does not know which tenant caused which request. In some cases, this is because the service is not configured to communicate to the underlying resource which tenant a request is associated with. In other cases, the underlying resource may be designed to track and throttle usage at a per-service level, not at a per-tenant level.

It is with respect to these and other technical challenges that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

Technologies are disclosed for real-time workload tracking and throttling within a multi-tenant network service. As described in greater detail below, the technologies disclosed herein can be utilized to throttle requests from overactive tenants before an underlying resource, such as a database, throttles the entire service. Preventing the entire service from being throttled insulates other tenants from the behavior of the overactive tenant. Other technical benefits can also be realized through implementations of the disclosed technologies.

As discussed briefly above, multi-tenant network services commonly rely on underlying resources, such as structured query language (SQL) databases, memory object caches, queues, NoSQL tables, and other software applications. In some configurations, a client-side workload tracker periodically analyzes each tenant's usage of an underlying resource to determine if and how a tenant should be throttled. The workload tracker stores data identifying the tenants that are to be throttled, and how to throttle them, in a throttled tenants table.

While processing a request received from a tenant, a throttle checker queries the throttled tenants table to determine if and how that tenant's request should be throttled. In this way, if an overactive tenant is consuming too many resources, the service throttles the overactive tenant before the underlying resource throttles the service.

The service may soft throttle or hard throttle a request. A soft throttle processes the request, but also indicates to the tenant that a resource usage threshold is nearing. A hard throttle rejects the request, indicating to the tenant that a resource usage threshold has been exceeded. In some configurations, a hard throttle may reject some but not all requests, e.g. a percentage of requests, requests from a particularly overactive computing device, requests from a particularly overactive application, or the like.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is an illustration of a throttled tenant table listing throttle states of tenants of a service.

FIG. 7 is an illustration of resource usage metrics tables.

FIG. 8C is a block diagram illustrating a service receiving responses from the underlying resource and updating a usage metrics table.

DETAILED DESCRIPTION

The technologies disclosed herein provide for technical improvements in the implementation of real time multi-tenant workload tracking and auto throttling. As described briefly above, an underlying resource utilized by a multi-tenant network service can become overwhelmed. In response, the underlying resource may throttle the service. Often, an overactive tenant causes the service to overutilize the underlying resource. However, the underlying resource may be unable to distinguish which tenant caused which request, and so the underlying resource may not be able to throttle requests caused by the overactive tenant. By causing the service as a whole to be throttled, the overactive tenant may cause requests from other tenants that utilize the service to stall, crash, or otherwise become unreliable. In severe cases, when the service is part of a larger application, the throttled service may require the entire application to be restarted, leading to down time and loss of data.

To address this technological challenge, and potentially others, a tenant workload tracker within a multi-tenant network service measures how much each tenant uses the underlying resource. With this information, a throttle checker within the service can identify and prevent overutilization by an overactive tenant before the underlying resource throttles the service. This increases reliability, as an overactive tenant is less likely to cause other tenants to stall or crash. The disclosed technologies may also improve fairness of access among tenants by limiting use by an overactive tenant. The disclosed technologies may also provide other technical benefits other than those described herein. Additional details regarding these aspects and others will be provided below with regard to the several FIGS.

Figure 1:
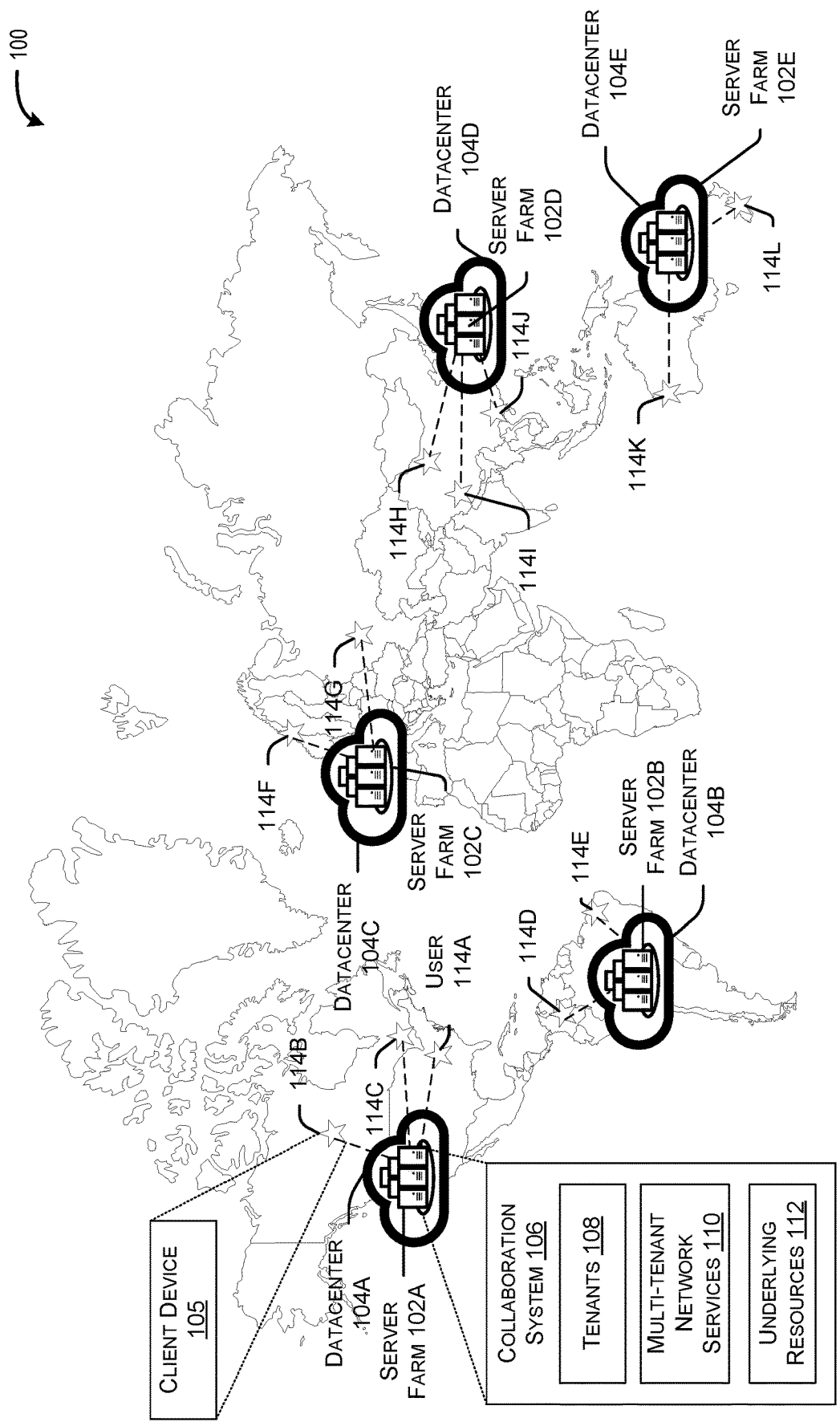
FIG. 1 is a block diagram illustrating a collaboration system containing services and underlying resources, as disclosed herein.

FIG. 1 is a block diagram 100 illustrating a collaboration system 106 containing multi-tenant network services 110 and underlying resources 112, as disclosed herein. Collaboration system 106 is depicted as executing on server farm 102A, which is located within datacenter 104A. Collaboration system 106 may also be associated with one or more tenants 108.

FIG. 1 illustrates multiple datacenters 104 hosting multiple server farms 102 around the world. Collaboration system 106 is depicted as deployed to server farm 104A, but collaboration system 106 may interact with other deployments of collaboration system 106 in other server farms 102. Collaboration system 106 may be distributed in that it executes across multiple computing devices in a server farm 102, e.g. a service 110 and an underlying resource 112 may execute on different computing devices.

FIG. 1 also illustrates users 114, each of which may be associated with one of tenants 108. In some configurations, user 114B uses client device 105 to access collaboration system 106. For example, user 114B may use client device 105 to navigate to a web page hosted by collaboration system 106. While rendering the web page, collaboration system 106 may send requests to services 110. The requests may include an identifier of the tenant associated with user 114B, e.g. a tenant name or other unique identifier. With this information, services 110 may track usage of underlying resources 112 on a per-tenant basis.

Services 110 may be invoked in other ways. For example, one or more of services 110 may be publicly exposed as a web service, e.g. as a web service used to synchronize files in a web-hosted directory. Services 110 may also be invoked autonomously, e.g. based on a timer on client device 105 or server farm 102. Services 110 may also be invoked by another service. Regardless of how services 110 are invoked, data identifying the tenant that generated a request (i.e. tenant identifiers) may be provided with each request to enable tracking usage of underlying resources 112 on a per-tenant basis.

In some configurations, usage of underlying resources 112 may be tracked and throttled in additional ways. Requests sent to one of services 110 may identify which client device and/or internet protocol (IP) address the request originated from. In some configurations, tenants 108 are associated with applications other than collaboration system 106, and the request identifies which application originated the request. In some configurations, applications such as collaboration system 106 are comprised of different components, e.g. different web pages, which may also be identified by the request. Any and all of this identifying information may be stored and used to selectively throttle requests from a tenant, e.g. throttling requests from a particular computing device or that are associated with a particular web page, while allowing other requests from the tenant to be processed.

In some configurations, collaboration system 106 is used to share documents and files, host web sites, and enable document retention, information security, and other process requirements of the organization deploying it. Examples of collaboration systems include Microsoft SharePoint™, Google Drive™, Atlassian Confluence™ Box for Business™, and Drupal™. However, other types of systems are similarly contemplated, including email servers, web servers, application servers, or any other type of multi-tenant application. Accordingly, the term 'collaboration system' as used herein encompasses these systems and potentially others.

Figure 2:
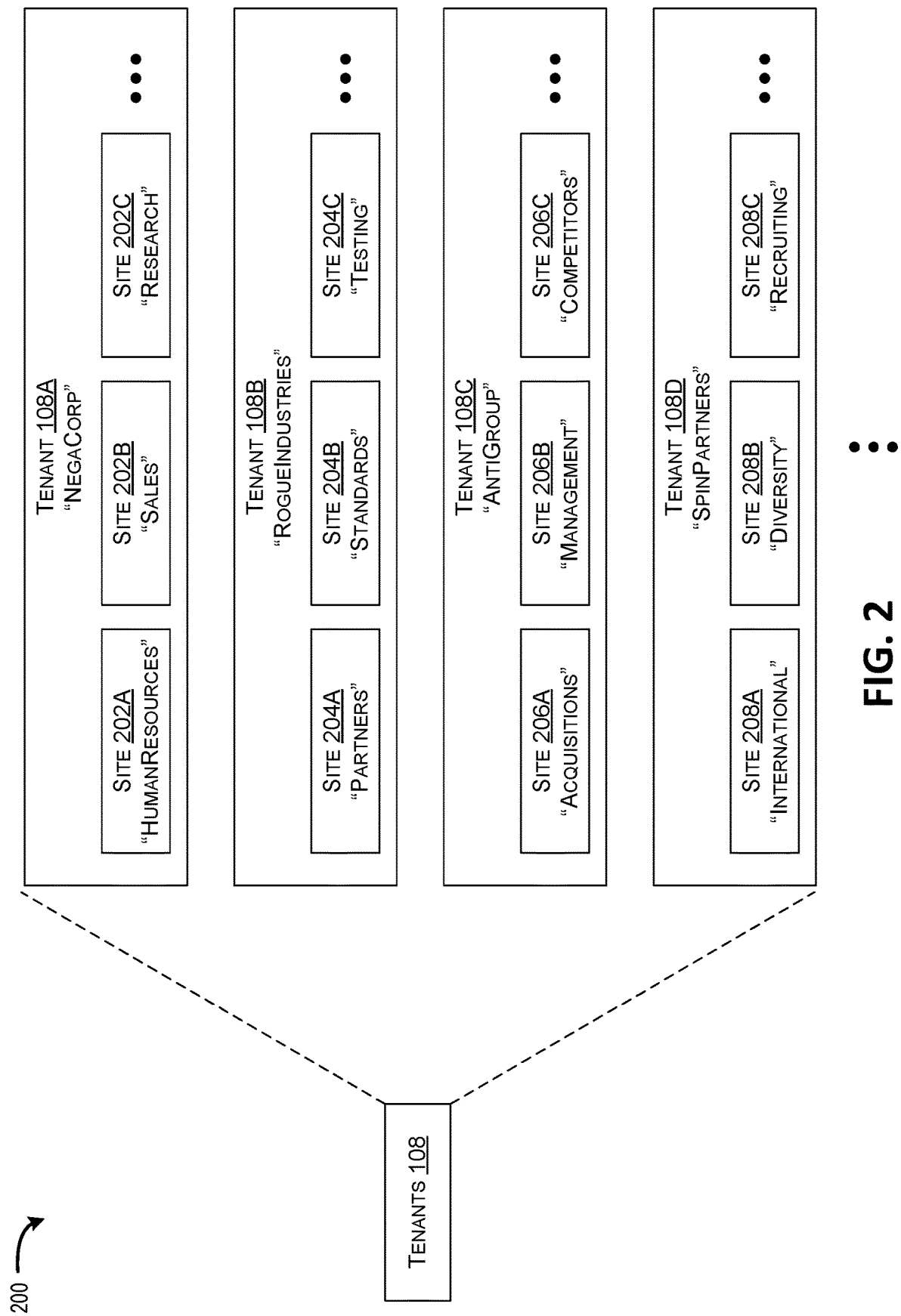
FIG. 2 is a block diagram illustrating an example list of tenants associated with a collaboration system.

FIG. 2 is a block diagram 200 illustrating an example list of tenants 108 associated with collaboration system 106. In some configurations, each tenant 108A-108D represents a different entity that uses collaboration system 106, e.g. "NegaCorp", "PosiIndustries", "AntiGroup", and "SpinPartners". While four tenants are listed, this is for illustrative purposes only—hundreds of thousands or millions of tenants may be supported by a single deployment of collaboration system 106.

In some configurations, collaboration systems allow a tenant 108 to establish multiple sites 202. Each site 202 may represent a self-contained unit of functionality usable by a team within the tenant's organization. For example, "NegaCorp" has sites 202A, "HumanResources", site 202B, "Sales", and site 202C, "Research". Each site 202 may operate independently of the others. For example, documents, files, lists, websites, and other items stored for the "HumanResources" site 202A may be stored separately, logically or physically, from documents, files, lists, websites, and other items stored for the "Sales" site 202B.

Figure 3:
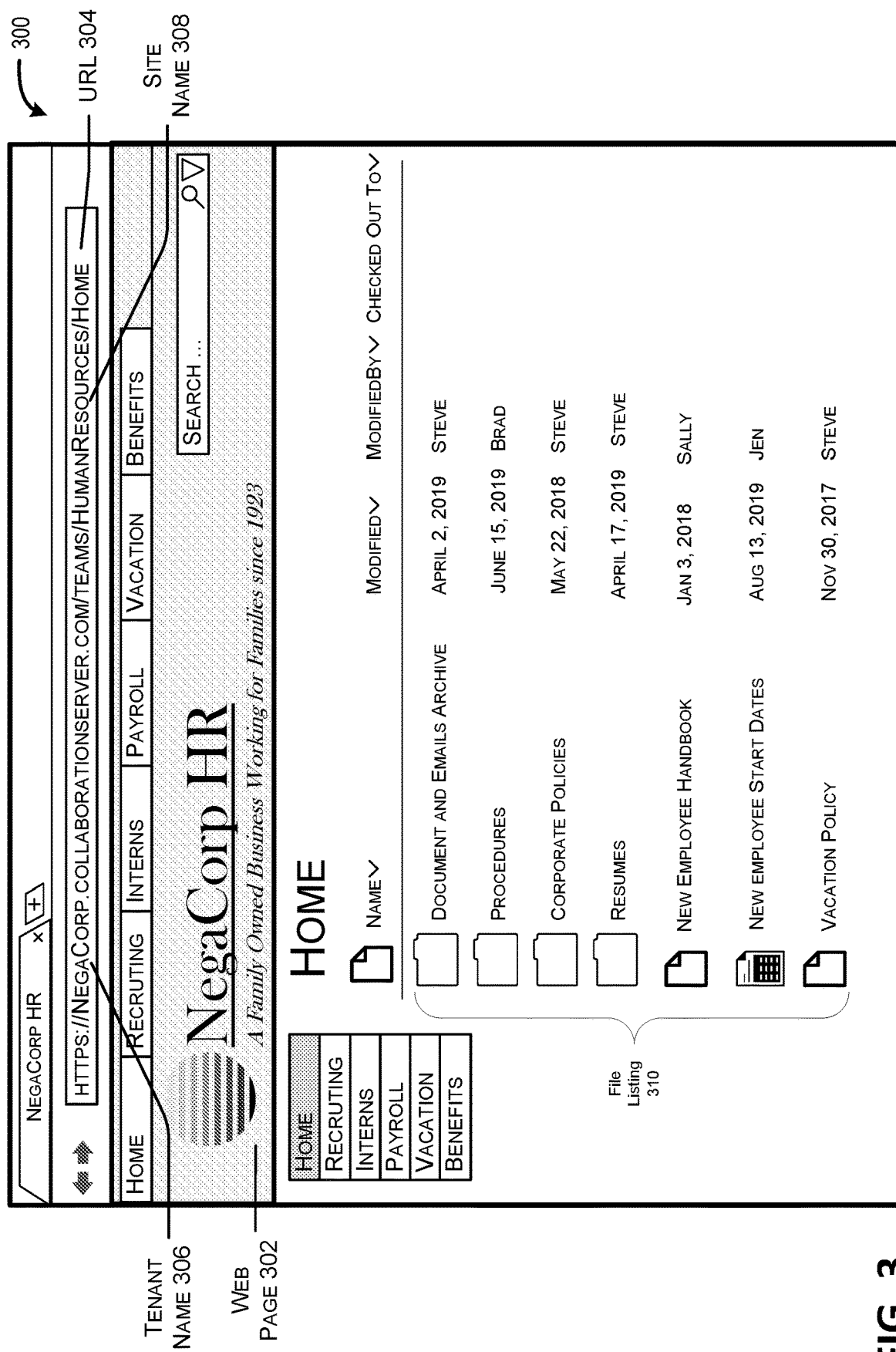
FIG. 3 is an illustration of a web page that includes a query result returned by an underlying resource.

FIG. 3 is an illustration 300 of a web page 302 that includes a file listing 310 returned by a service 110. Uniform Resource Locator (URL) 304 is an example of a URL that a user 114 may employ to navigate to a particular site 202 associated with a particular tenant 108. In this example, the site name 308 is "HumanResources" and the tenant name 306 is "NegaCorp."

Web page 302 includes a file listing 310 associated with the "HumanResources" site 308 of the "NegaCorp" tenant 306. The file listing 310 may be generated in part by submitting a request to one of services 110 that lists files and folders. In some configurations, the request includes the tenant name "NegaCorp". The service may process the request in part by submitting a request to an underlying resource, such as an underlying SQL database, that returns a list of files associated with the "home" page of the "HumanResource" site 308. The multi-tenant service may return the list of files associated with the 'home' page to the collaboration system 306 that is generating web page 302.

Figure 4:
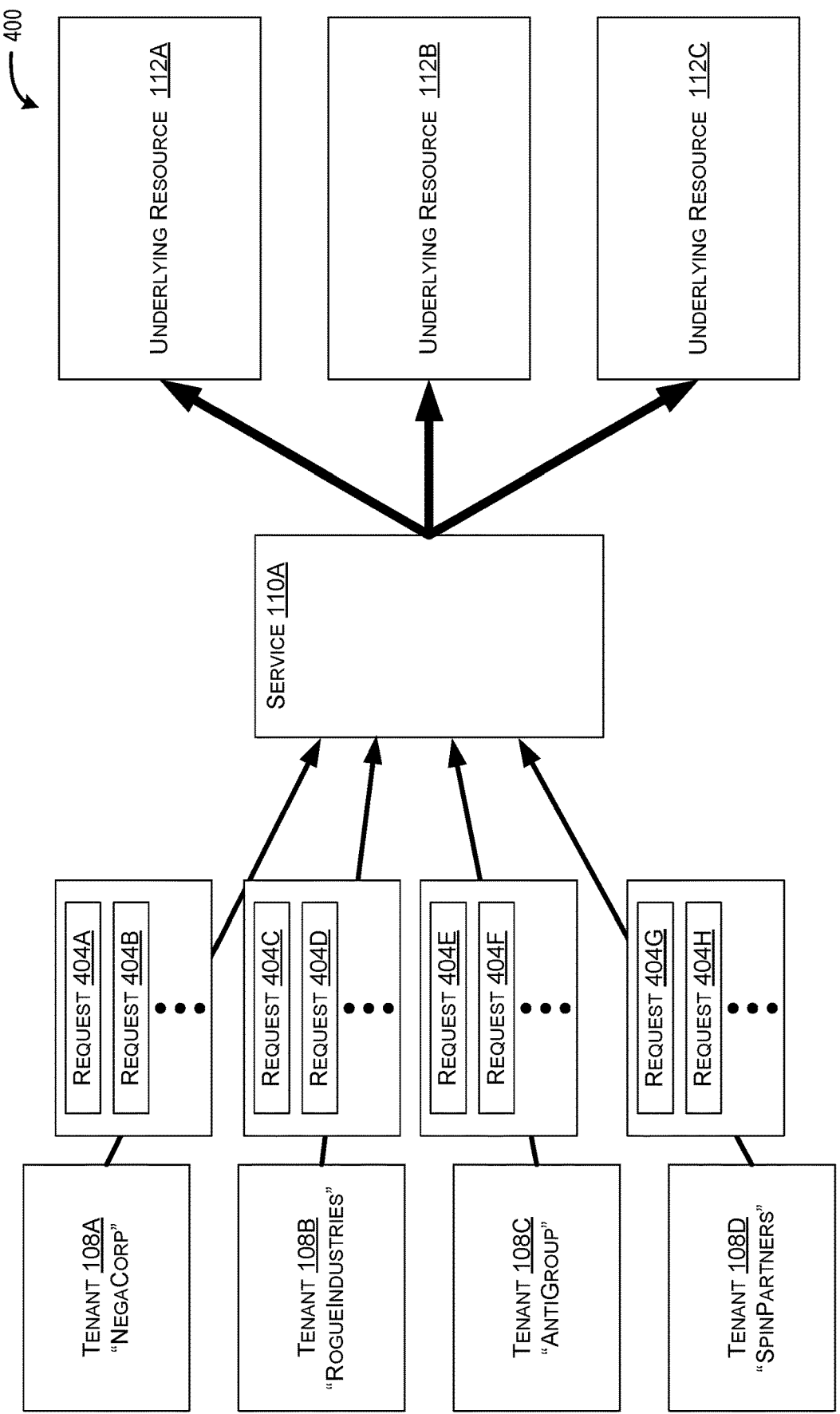
FIG. 4 is a block diagram illustrating an example of a service receiving requests from multiple tenants.

FIG. 4 is a block diagram 400 illustrating an example of a service 110A receiving requests 404 from multiple tenants 108. A computing device associated with a single user, e.g. an administrator, may send many requests 404 at once, or within a short period of time. For example, a tenant administrator may enforce a document retention policy by deleting hundreds, thousands, or millions of documents within the tenant (or within sites that are part of the tenant) with a single request 404A. In other cases, computing devices associated with many users of the same tenant may send requests at or near the same time, e.g. requests to save a document, create an email, retrieve a web page, etc. Using a technique described in conjunction with FIGS. 8-9, service 110A monitors the utilization of underlying resources 112 caused by each tenant, and throttles some or all requests associated with individual tenants before an underlying service throttles service 110A as a whole.

As discussed above, underlying resources 112 may include databases (e.g. SQL databases), NoSQL tables, queues, memory caches, or any other type of application. Underlying resources 112 may be hosted in a server accessed over the internet or on an 'on-premise' server accessed over an intranet. Underlying resources 112 may be hosted within the same datacenter 104 as the service 110A that sends it a request, or underlying resources 112 may be hosted in a different location. In some configurations, underlying resources 112 may run on the same machine as service 110A, e.g. in a different process.

In some configurations, underlying resource 112A may be invoked by multiple services 110. As such, underlying resource 112A may itself be considered a multi-tenant service. However, to avoid confusion, this document refers to these resources 112 as underlying resources, not underlying services. Also, this document refers to invoking an underlying resource 112A as sending a request to the underlying resource 112A to perform an operation. Requests sent to a service 110 and requests sent to an underlying resource 112 are distinguished by element numbers. For example, see FIG. 8B, in which service 110A sends database requests 806A to an underlying resource 112A. In this regard, it is to be appreciated that what is described herein as an underlying resource might alternately be referred to as a service.

In some configurations, an underlying resource 112A may become overwhelmed when hardware capacity is reached, i.e. when the underlying resource 112A receives more requests from services 110 than it can process in a timely manner (e.g. within a defined amount of response time). Additionally, or alternatively, underlying resource 112A may set usage limits for individual services. In this case, service 110A may overwhelm a service-specific usage limit even if underlying resource 112A has spare hardware capacity. Service-specific usage limits may be based on an amount of capacity purchased for service 110A, based on a fair distribution of resources across multiple services 110, or the like.

Figure 5:
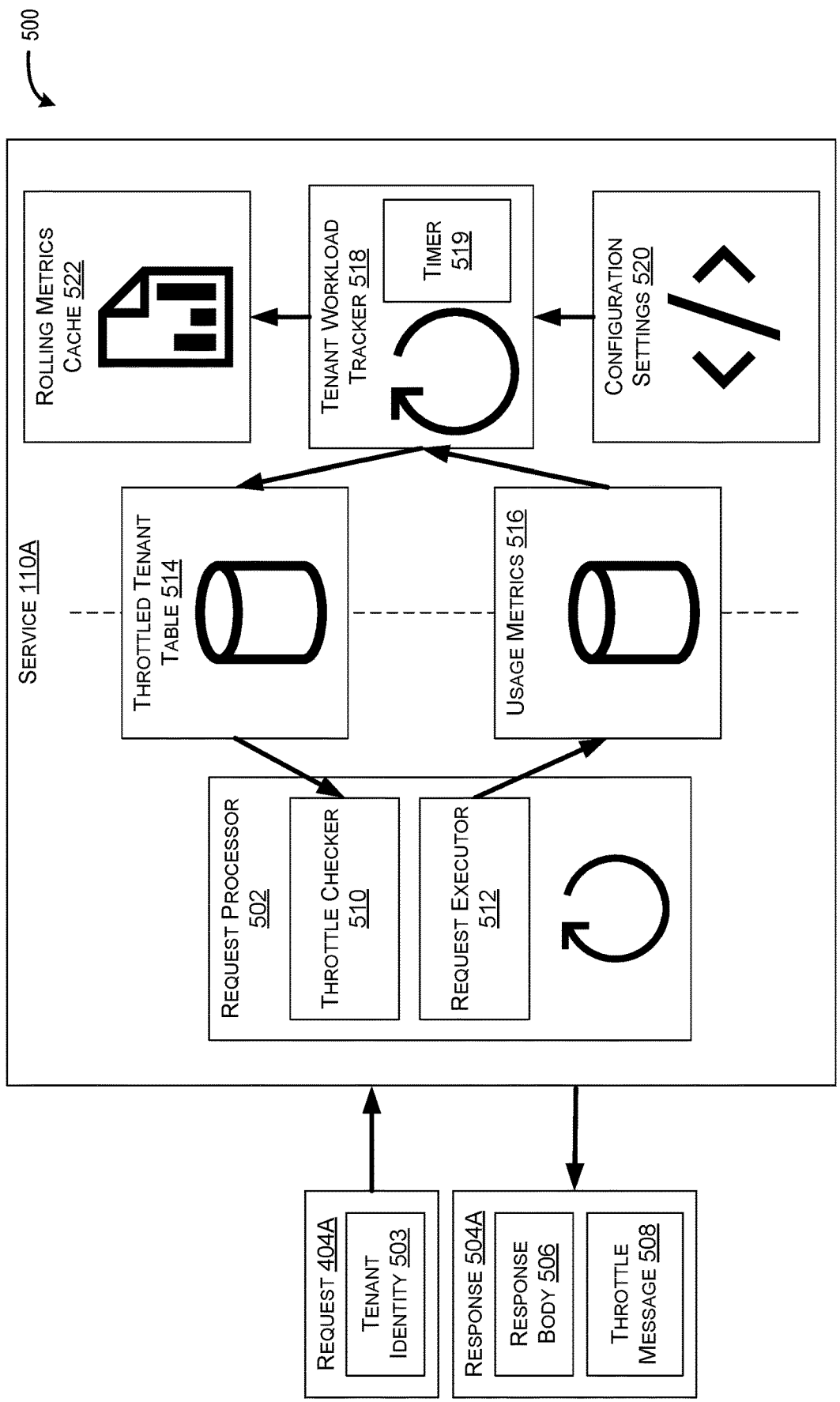
FIG. 5 is a block diagram illustrating components of a service.

FIG. 5 is a block diagram 500 illustrating components of a service 110A. In some configurations, service 110A receives a request 404A. Service 110A may include request processor component 502, tenant workload tracker component 518, throttled tenant table 514, usage metrics 516, configuration settings 520, and rolling metrics cache 522.

In some configurations, request processor component 502 includes throttle checker component 510 and request executor component 512. Request processor component 502 is a software module that can receive and process request 404A from tenant 108A.

Request 404A may include or be associated with tenant identity 503. Tenant identity 503 may be a unique identifier, e.g. a Globally Unique Identifier (GUID), a tenant name (e.g. "NegaCorp), a qualified tenant name (e.g. negacorp.com), an Internet Protocol address (e.g. 23.14.5.133), a Media Access Control (MAC) address, a username, or any other data that uniquely identifies a tenant of collaboration system 106. Request 404A may include tenant identity 503 as a parameter passed to service 110A, as a header (e.g. a hyper-text transfer protocol (HTTP) header), or as part of the body of request 404A. Additionally, or alternatively, tenant identity 503 may be derived from an identity associated with a connection that request 404A is received over.

In some configurations, before executing request 404A, request processor component 502 invokes throttle checker component 510 to determine if and how tenant 108A has been throttled. Throttle checker component 510 is a software module that can refer to throttled tenant table 514 to determine if and how tenant 108A has been throttled. Throttled tenant table 514 may store data identifying the results of calculations performed by tenant workload tracker component 518. In this way, the decision whether and how to throttle request 404A can be made quickly based on a table lookup—request processor component 502 does not have to delay responding to request 404A while determining whether and how to throttle a tenant. One example of a throttled tenant table 514 is discussed below in conjunction with FIG. 6, but briefly, throttled tenant table 514 may include one entry per tenant, where each entry indicates whether that tenant is throttled, and if so, whether it is soft throttled or hard throttled. In some configurations, throttled tenant table 514 may also indicate specific users, computing devices, IP addresses, applications, or other sources of request 404A to throttle, and if so, how to throttle them.

If throttle checker component 510 determines that tenant 108A is not throttled, request executor component 512 may perform the requested functionality. Performing the requested functionality may include sending requests to one or more of underlying resources 112.

In some configurations, throttled tenant table 514 may indicate that a tenant is soft throttled. Determining whether a tenant is soft-throttled is discussed below in conjunction with tenant workload tracker component 518. When a tenant 108A is soft-throttled, request executor component 512 may process requests from tenant 108A as if tenant 108A were not throttled. However, when soft-throttled, request executor component 512 may add a throttle message 508 to response 504A.

Throttle message 508 may be included as a return value of service 110A, included as a header of response 504A (e.g. an HTTP header), and/or included as part of response body 506. Throttle message 508 may indicate that one or more underlying resources 112 are close to being overwhelmed, e.g. one or more underlying resources 112 are running at capacity and/or tenant 108A has reached a tenant-specific usage threshold.

Throttle message 508 might also, or alternately, specify the identity of the underlying resource that is close to capacity and how close the underlying resource is to capacity. In some configurations, throttle message 508 comprises an HTTP 429 response status code, indicating that tenant 108A is sending too many requests. In some configurations, throttle message 508 includes a suggestion to implement a back-off procedure, such as an exponential back-off procedure, such that tenant 108A throttles itself before service 110A throttles tenant 108A.

In some configurations, request executor component 512 records how many resources underlying resource 112A uses to process request 404A. Request executor component 512 may estimate how many resource will be used, measure how many resources were used, and/or interpret responses from the underlying resource 112A that indicate how many resources were used. Request executor component may record any kind or resource utilization data, including CPU usage, memory usage, storage usage, database usage, etc. Request executor component 512 may store data collected regarding usage of underlying resources 112 in usage metrics 516. Usage metrics 516 are described in more detail below in conjunction with FIG. 7.

In some configurations, tenant workload tracker component 518 operates on a different thread of execution than request processor component 502. As such, tenant workload tracker component 518 may execute independently of requests processed by request processor component 502. Instead, tenant workload tracker component 518 may execute periodically, e.g. in response to a timer event from timer 519, in response to approaching a usage threshold of an underlying resource 112, in response to a spike in request volume received from one or more tenants, etc.

For example, tenant workload tracker component 518 may execute once a minute in response to timer events generated by timer 519. In another configuration, tenant workload tracker component 518 may execute if service 110A is close to reaching a usage threshold of underlying resource 112A. For example, request executor component 512 may receive a response from underlying resource 112A that indicates service 110A is close to a usage threshold. Request executor component 512 may then cause tenant workload tracker component 518 to execute in order to update which tenants 108 to throttle.

Tenant workload tracker component 518 may also be triggered by a spike in requests associated with tenant 108A. To identify spikes in resource requests, request executor component 512 may track an average rate of requests sent to underlying resource 112A. Request executor component 512 may trigger tenant workload tracker component 518 when request volume from a particular tenant increases by a defined percentage within a defined amount of time. For example, request executor component 512 may trigger tenant workload tracker component 518 if a request volume for a particular tenant has increased by 50% within 30 seconds.

Tenant workload tracker component 518 may also be triggered by a tenant 108A that causes a high percentage of requests to underlying resources 112. For example, request executor component 512 may trigger tenant workload tracker component 518 when a request volume from a particular tenant is more than a defined percentage of total requests, e.g. if more than 30% of total requests received by service 110A come from tenant 108A.

Once triggered, tenant workload tracker component 518 may retrieve usage metrics 516 to determine whether requests from tenant 108A should be throttled, and if so, how they should be throttled. In some cases, tenant workload tracker component 518 may determine whether a tenant is to be throttled based on configuration settings 520. Tenant workload tracker component 518 may store intermediate calculations and other data for use by future iterations of tenant workload tracker component 518 in rolling metrics cache 522.

Tenant workload tracker component 518 may determine whether and how to throttle requests from a tenant 108 based on a number of criteria. For example, tenant workload tracker component 518 may identify anomalous usage by analyzing metrics 516 on a per-tenant and per-underlying resource basis. In some configurations, requests from tenant 108A may be throttled when they exceed a defined threshold rate for an underlying resource, e.g. when requests from tenant 108A cause underlying resource 112A to perform 500 or more operations per minute. In some configurations, the criteria are only met if the threshold rate is exceeded for a defined amount of time, e.g. 5 minutes.

Other criteria used by tenant workload tracker component 518 may be based on a processing load caused by tenant 108A. For example, tenant workload tracker component 518 may determine a processing load by multiplying a rate at which underlying resource 112A performs operations caused by tenant 108A by an average computing resource cost to perform each operation (e.g. compute, memory, disk, and network costs, application specific costs such as a number of row scanned in a database or a number of contacts retrieved from a corporate directory, etc.). If tenant workload tracker component 518 determines that the processing load exceeds a threshold for tenant 108A, tenant workload tracker component 518 may throttle tenant 108A. In some configurations, the processing load threshold is met when the threshold load is exceeded for a defined amount of time.

Another criteria used by tenant workload tracker component 518 is based on identifying when requests from tenant 108A cause more than a defined threshold percentage of all operations performed by underlying resource 112A. For example, tenant 108A may be throttled if tenant workload tracker component 518 determines that requests from tenant 108A cause more than 30% of the operations performed by underlying resource 112A.

Another criteria used by tenant workload tracker component 518 is based on a threshold rate of exceptions returned by underlying resource 112A. For example, if five or more exceptions are returned from underlying resource 112A per minute, tenant workload tracker component 518 may throttle requests from tenant 108A regardless of the rate of operations, complexity of operations, overall percentage of operations, or other criteria. Exceptions may include invalid operation exceptions, out of memory exceptions, or any other type of error that may be encountered by underlying resource 112A when processing request 404A from tenant 108A.

Another criteria used by tenant workload tracker component 518 is based on identifying a spike in usage rates, loads, exception rates, and overall usage percentage. For example, if tenant 108A increases the number of operations per second by 33% in 45 seconds, tenant workload tracker component 518 may throttle tenant 108A, even if tenant 108A has a low usage percentage compared to other tenants. The amount of increase and the amount of time over which the increase occurs before throttling may be user-configured and stored in configuration 520.

Other criteria used by tenant workload tracker component 518 to determine whether and how to throttle requests from tenant 108A is to apply some or all of the criteria disclosed herein to multiple underlying resources 112. For example, if service 110A utilizes four underlying resources 112, request rates, loads, exception rates, and the like may be aggregated from some or all of underlying resources 112. The thresholds applied when aggregating metrics from multiple underlying resources 112 may be increased by a defined percentage of the number of underlying resources 112. For example, if tenant workload tracker component 518 analyzes data from four underlying resources 112, thresholds may be increased by half this amount, i.e. thresholds may be doubled compared to thresholds applied to a single underlying resource. In this way, tenants that may not cross a threshold for any individual underlying resource, but which still account for an oversized share of usage across multiple underlying resources 112, may be identified and throttled.

Thresholds applied by tenant workload tracker component 518 when evaluating a criteria may be modified (i.e. increased or decreased) based on a number of factors. For instance, thresholds may be increased or decreased based on: a historic rate of operations caused by tenant 108A; a historic per-operation cost associated with tenant 108A; a historic rate of exceptions caused by tenant 108A; a service level agreement between tenant 108A and service 110A; an overall load of service 110A; an overall load of underlying resource 112A; or the like.

For example, tenant workload tracker component 518 may analyze a tenant associated with a higher than average historical rate of operations, but which has operated consistently at the higher rate without overwhelming underlying resource 112A, with increased thresholds. If tenant 108A is associated with a higher historical rate of operations, e.g. 600 operations per minute compared to a typical tenant which causes 200 operations per minute, tenant workload tracker component 518 may increase the threshold number of operations per minute from 500 to 900. In this way, a tenant that causes underlying resource 112A to perform a large number of low-load operations, without overwhelming underlying resource 112A, is allowed to continue operating unthrottled.

Thresholds applied by tenant workload tracker component 518 may be increased if underlying resource 112A is operating under a reduced overall load. Conversely, threshold applied by tenant workload tracker component 518 may be decreased if underlying resource 112A is operating under an increased load.

Thresholds applied by tenant workload tracker component 518 may be increased or decreased based on an amount of data stored in metrics 516 that is associated with a particular tenant, or an amount of time over which data has been captured for a particular tenant. For example, if tenant 108A has been accessing an underlying resource 112A for less than a defined amount of time, or if less than a defined amount of data has been captured for tenant 108A, thresholds used by tenant workload tracker component 518 may be decreased, making service 110A more sensitive to increased usage caused by tenant 108A.

Similarly, if service 110A has been responding to requests from tenant 108A for greater than a defined amount of time, and if tenant 108A does not have a history of overwhelming an underlying resource, tenant workload tracker component 518 may increase thresholds such as the defined rate of operations (e.g. 500/minute) that can be submitted before throttling occurs. In this way, tenant 108A is given more leeway in light of a history of not overwhelming underlying resource 112A.

In some configurations, tenant workload tracker component 518 may apply multiple thresholds when determining when and how to throttle requests from tenant 108A. A soft-throttle threshold, which is crossed sooner than a hard-throttle threshold, may cause tenant workload tracker component 518 to create a soft-throttled entry in throttled tenant table 514 for tenant 108A. Similarly, when a hard-throttle threshold is crossed, tenant workload tracker component 518 may create a hard-throttled entry in throttled tenant table 514 for tenant 108A.

Throttled tenant table 514 is discussed in detail below in conjunction with FIG. 6, but briefly, entries in throttled tenant table 514 may include tenant identity 503, throttle state, and a timestamp indicating when the throttle began. In some configurations, throttled tenant table 514 lists specific users, computing devices, IP addresses, and/or applications to throttle (or exclude from throttling), as discussed above.

In some configurations, tenant workload tracker component 518 applies a hard throttle to tenant 108A if the soft-throttle threshold is exceeded for a defined period of time. For example, if a soft-throttle threshold of 500 operations per minute is exceeded for 10 minutes, tenant workload tracker component 518 may change the soft-throttle of tenant 108A to a hard throttle. In some cases, tenant workload tracker component 518 throttles tenants when they exceed a threshold for a defined period of time.

As discussed above, Throttle checker component 510 may use the information stored in throttled tenant table 514 to determine whether to process a request from tenant 108A. A soft-throttle state associated with tenant 108A may allow subsequent requests from tenant 108A to be processed while adding throttle message 508 to the response 504. In this way, tenant 108A is alerted that a soft-throttle threshold has been crossed and that a hard throttle may be applied if usage caused to underlying resource 112A is not reduced.

A hard-throttle state associated with tenant 108A may cause requests 404 from tenant 108A to be rejected. In some configurations, all requests 404 from tenant 108A are rejected. In other configurations, requests from particular computing devices, users, IP addresses, or applications are rejected. In some configurations, requests 404 from some computing devices associated with tenant 108A are soft throttled while requests from other computing devices—typically computing devices that are causing more than a defined number/complexity of operations on behalf of tenant 108A—are hard throttled.

FIG. 6 is an illustration 600 of throttled tenant table 514 depicting throttle states of tenants of service 110A. In some configurations, throttled tenant table 514 includes a tenant identifier column 602, a throttle state column 604, and a timestamp column 606. Each of rows 608 may depict one entry in throttled tenant table 514.

Tenant identifier column 602 may uniquely identify a specific tenant, e.g. tenant 108A. Tenant workload tracker component 518 may use column 602 to find and update a tenant's throttle status, while Throttle checker component 510 may use column 602 to locate the throttle status of a particular tenant.

Throttle state column 604 may indicate whether a particular tenant is throttled. A tenant may be indicated as not throttled by an entry of 'NONE' or '0' or with no entry at all (e.g. NULL), while an entry of 'SLOW' may indicate a slow-throttled tenant, and an entry of 'HARD' may indicate a hard-throttled tenant. 'NONE', 'SLOW', and 'HARD' are used as examples, and it is similarly contemplated that any other unique value can be used to indicate whether and how a tenant is throttled.

In some configurations, a throttle may be applied until tenant workload tracker component 518 discontinues throttling, e.g. based on a usage of underlying resource 112A. Additionally, or alternatively, a throttle may be applied for a defined amount of time, after which throttle checker component 510 may ignore the throttle and/or update throttle state column 604 to remove the throttle.

In some cases, the defined amount of time may be listed in configuration settings 520. The defined amount of time may be different for different criteria. For example, a throttle triggered based on a rate of requests sent to an underlying resource may be in effect for 5 minutes while a throttle triggered based on a rate of exceptions may be in effect for 10 minutes. The defined amount of time may be affected by whether the throttle is a hard throttle or a soft throttle, e.g. the defined amount of time may increase by 50% for a hard throttle. The defined amount of time may also be affected by a degree to which a criteria's threshold was crossed—large and/or consistent violations of a criteria may cause a throttle to be in effect longer than short and/or intermittent violations. In some configurations, timestamp column 606 may include data indicating when the throttle went into effect. Throttle checker component 510 may subtract this value to the current time to determine how long a throttle has been in effect.

In other configurations, the defined amount of time a throttle is in effect may be determined or adjusted by tenant workload tracker component 518. In these cases, tenant workload tracker component 518 may store the defined amount of time in a throttle expiration column of throttled tenant table 514. Tenant workload tracker component 518 may set or adjust how long a throttle is in effect based a on usage history of tenant 108A, overall workloads of underlying resource 112A and/or service 110A, and other live data.

For example, if tenant workload tracker component 518 analyzes a usage history and determines that requests from tenant 108A are satisfying a throttle criteria for the first time, or for the first time since a defined cool-down period has elapsed, tenant workload tracker component 518 may enforce a throttle for two minutes. However, if the usage history indicates that requests from tenant 108A have satisfied a throttle criteria more than a defined number of times, e.g. more than three times, tenant workload tracker component 518 may enforce a throttle for ten minutes.

FIG. 7 is an illustration 700 of resource usage metrics tables 516. In some configurations, usage metrics tables 516 store data captured by request executor component 512, such as database query count 704, database query duration 706, network connection usage 708, CPU usage 710, memory usage 712, grid transaction units 714, or the like. Each of rows 716 may contain one or more of these values for the identifier listed in tenant identifier column 702. In some configurations, request executor component 512 captures usage data into a single table 516. In other configurations, request executor component 512 captures usage data into multiple tables 516A, 516B, etc. Each table may store usage counts for a given time period. By comparing usage counts from different time periods, trends including spikes, drop-offs, and other changes over time may be detected. Request executor component 512 may also store metrics associated with different underlying resources 112 in different usage metrics tables 516, e.g. metrics associated with underlying resource 112A may be stored in usage metrics table 516A, while metrics associated with underlying resource 112B may be stored in usage metrics table 516B.

In some configurations, database query count 704 refers to a number of queries that tenant 108A caused service 110A to perform on a particular underlying database 112A. Similarly, database query duration 706 refers to an amount of execution time used by underlying database 112A to perform the requested operations.

In some configurations, network connection usage 708 refers to a number of outgoing network ports (ports) tenant 108A caused service 110A to open. Additionally, or alternatively, network connection usage 708 can refer to a number of outgoing ports tenant 108A caused underlying resource 112A to open. Network connection usage is one example network metric that may be captured—network bandwidth consumed, number of network requests made, and the like, are similarly contemplated. Usage metrics 516 may also include CPU usage 710 and memory usage 712. Often these values are returned from underlying resource 112A with the results of an operation.

Grid transaction units (GTUs) may represent an aggregation and/or composition of some or all of the other usage metrics of an underlying resource. GTUs may be based on a number of operations performed, complexity of operations, CPU usage, memory usage, and any other performance metric. GTUs may be the unit of measure with which a tenant provisions and pays for capacity from underlying resource 112A, and as such may be a metric used to determine if one of services 110 is approaching or has passed a usage threshold.

In some configurations, GTUs may be used by tenant workload tracker component 518 to determine if a throttle threshold has been met by direct comparison between a value in column 714 and a value set in configuration settings 520.

Figure 8A:
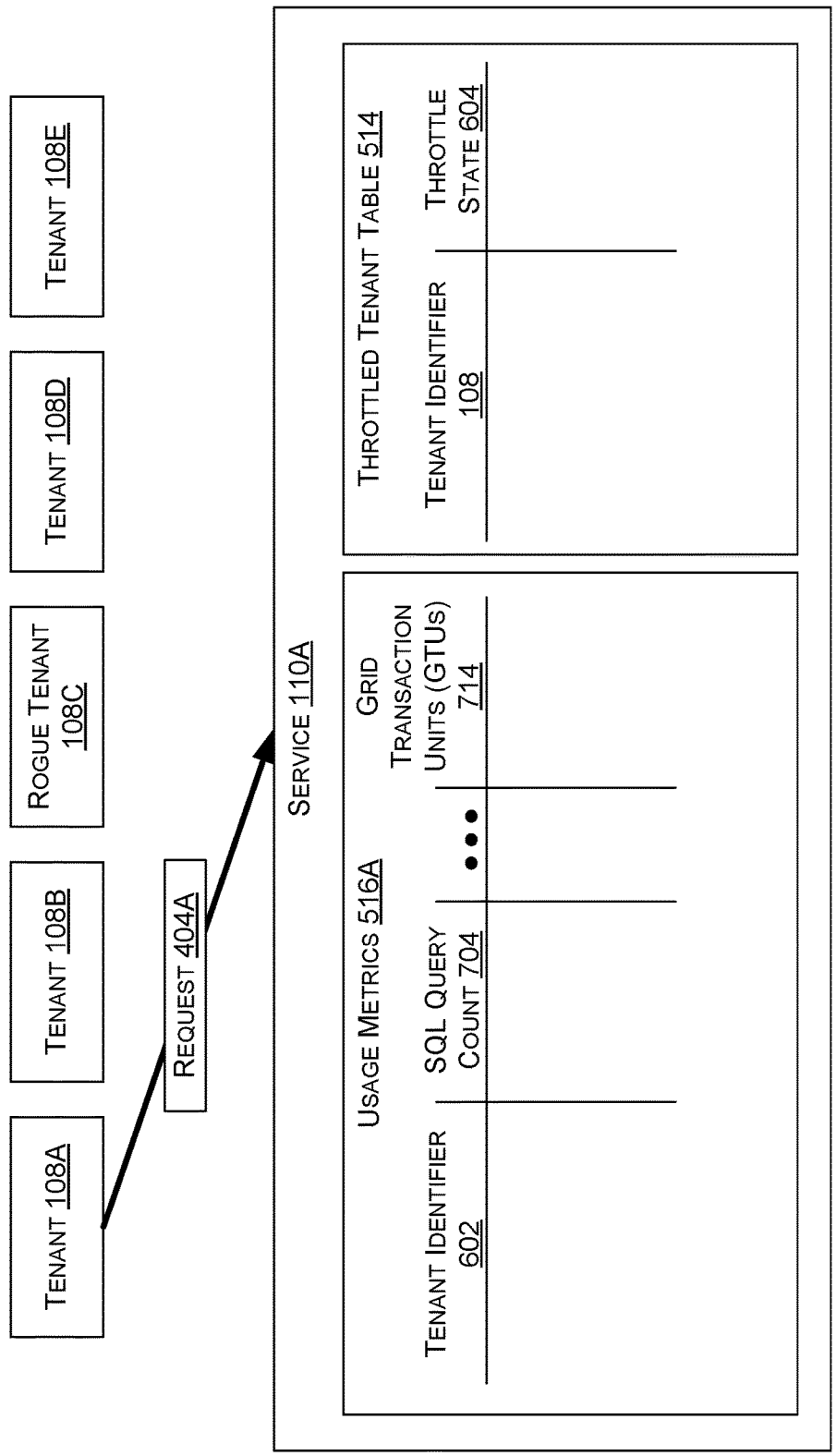
FIG. 8A is a block diagram illustrating a service receiving a request from a first tenant.

FIG. 8A is a block diagram 800 illustrating service 110A receiving request 404A from tenant 108A. In some configurations, receiving request 404A at service 110A from tenant 108A indicates that request 404A was initiated by or was otherwise caused by a user associated with tenant 108A. In some configurations, request 404A originates from a computing device that a user associated with tenant 108A has logged into. For example, an administrator of tenant 108A may use a command line interface to send a request 404A to rename site 202C from "Research" to "R&D".

In other configurations, request 404A may be generated indirectly in response to an action taken by a user associated with tenant 108A. For example, a user associated with tenant 108A may navigate to site 202C. While rendering site 202C, collaboration application 106 may use service 110A to retrieve a list of files and folders associated with site 202C.

In some configurations, request 404A is a web request, e.g. an HTTP or Simple Object Access Protocol (SOAP) based web request. As discussed above in conjunction with FIG. 5, request 404A may specify a tenant identity 503. Additionally, or alternatively, request 404A may otherwise be associated with tenant identity 503 of tenant 108A, e.g. by being sent over a connection opened by a user associated with tenant 108A.

In some configurations, service 110A uses throttle checker component 510 to determine whether and how to throttle request 404A from tenant 108A. In this example, usage metrics 516A is empty, and so tenant 108A is not currently throttled. As such, request 404A is allowed to be processed by request executor component 512.

Figure 8B:
FIG. 8B is a block diagram illustrating a service processing the request from the first tenant in part by sending requests to an underlying resource.
Figure 8B:
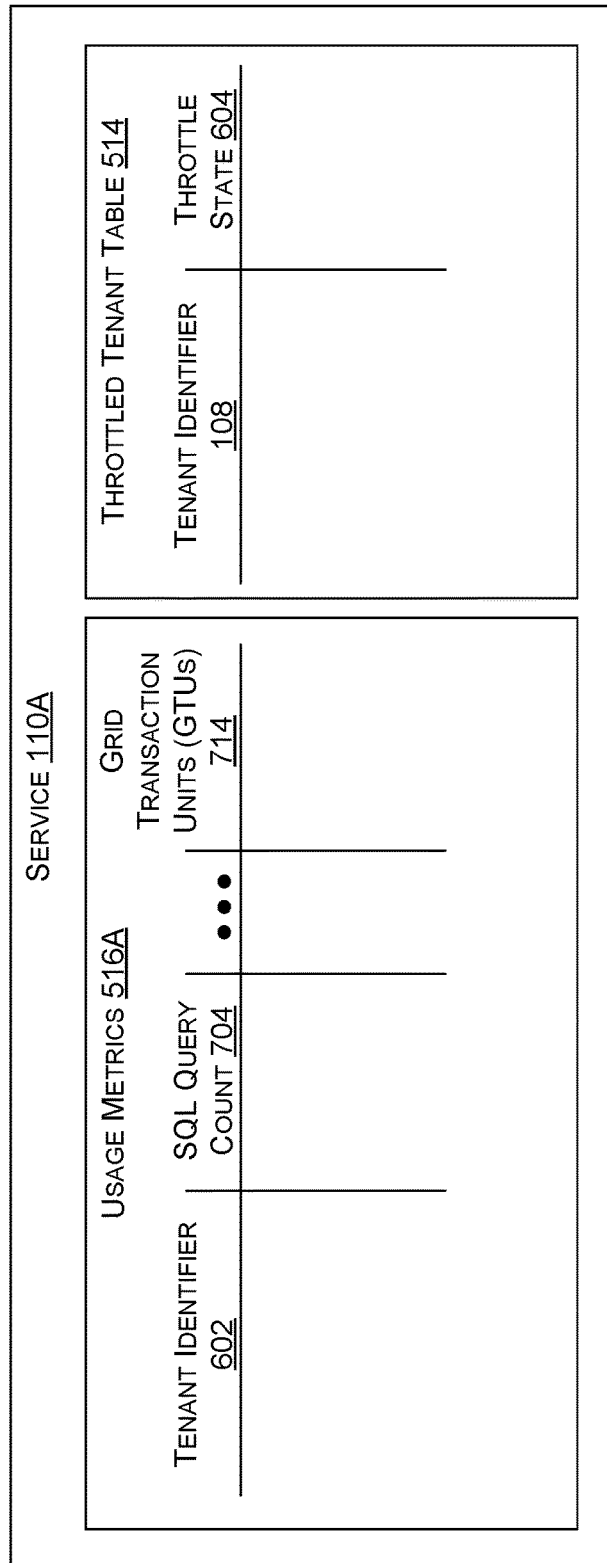

FIG. 8B is a block diagram 800 illustrating service 110A processing request 404A from tenant 108A in part by performing operations on underlying resource 112A. In some configurations, service 110A may perform some processing locally while responding to request 404A. However, service 110A may invoke one or more operations on underlying resource 112A. In the example configuration depicted in FIG. 8B, underlying resource 112A is a database, and service 110A has sent three database requests 806A to database 112A for processing.

In some configurations, service 110A may send each database request 806A separately to database 112A. In other configurations, service 110A may batch database requests 806A and send them at the same time to database 112A for execution. Furthermore, database requests 806A may be executed in series, in parallel, or a combination thereof. While not illustrated, service 110A may also invoke other underlying resources in responding to request 404A.

FIG. 8C is a block diagram 800 illustrating service 110A receiving database responses 808A from underlying resource 112A and updating usage metrics table 516A. In some configurations, request executor component 512 performs these steps. In some configurations, database responses 808A specify performance and usage metrics of the operations invoked by database requests 806A, including a CPU usage, a memory usage, a number of database operations performed, a number of outgoing network ports opened, or a number of DTUs consumed, etc. Database responses 808A may also include any other metric generated by a database and returned with query results. Similar metrics generated by other types of underlying resources are similarly contemplated.

In some configurations, service 110A takes metrics returned in database responses 808A and incorporates them into usage metrics 516A. For example, service 110A may add an entry into usage metrics 516A indicating that tenant 108A performed three SQL queries. In some configurations, usage metrics 516A is dedicated to metrics derived from usage of underling resource 112A. In other configurations, usage metrics 516A stores metrics from a number of underlying resources 112, and each row 716 includes a column identifying the underlying resource 112 a particular operation was performed by.

Figure 8D:
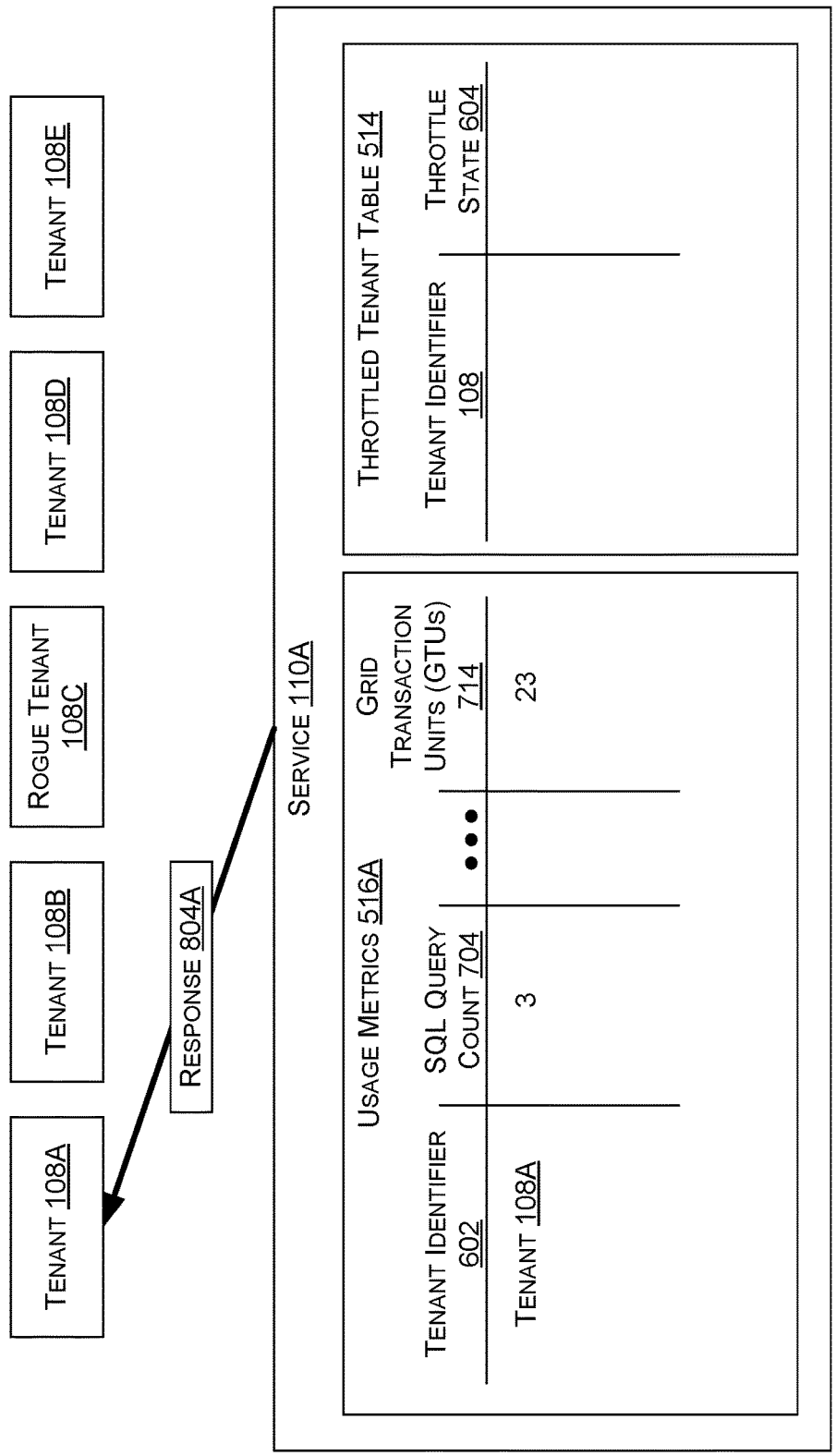
FIG. 8D is a block diagram illustrating the service responding to the request from the first tenant.

FIG. 8D is a block diagram 800 illustrating service 110A responding to request 404A from tenant 108A. In some configurations, response 804A is sent to tenant 108A including the results (e.g. return value) of service 110A. In some configurations, response 804A also includes a throttle message 508. However, in this example, request 404A was not throttled, and so any throttle message 508 included in response 804A would be empty.

Figure 8E:
FIG. 8E is a block diagram illustrating the service after a workload tracker has added the first tenant to a throttled tenants table.
Figure 8E:
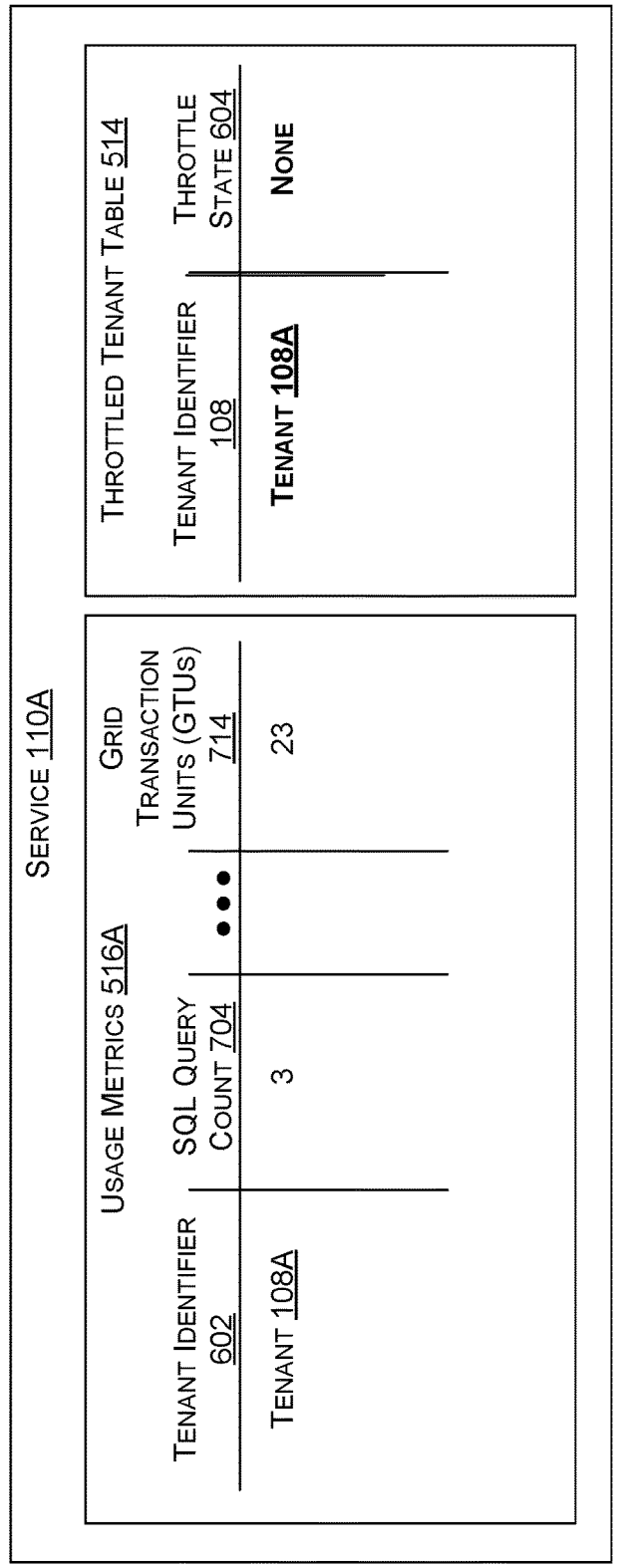

FIG. 8E is a block diagram 800 illustrating service 110A after tenant workload tracker component 518 has added tenant 108A to throttled tenants table 514. In some configurations, tenant workload tracker component 518 periodically scans usage metrics 516A for data used to update throttled tenant table 514. In this example, usage metrics 516A includes metrics for a single tenant—tenant 108A. The usage is de minimis—three SQL queries—i.e. not enough to exceed a threshold query rate such as 500/minute. As such, tenant workload tracker component 518 creates an entry in throttled tenant table 514 with a throttle state 604 of 'NONE'.

Figure 9A:
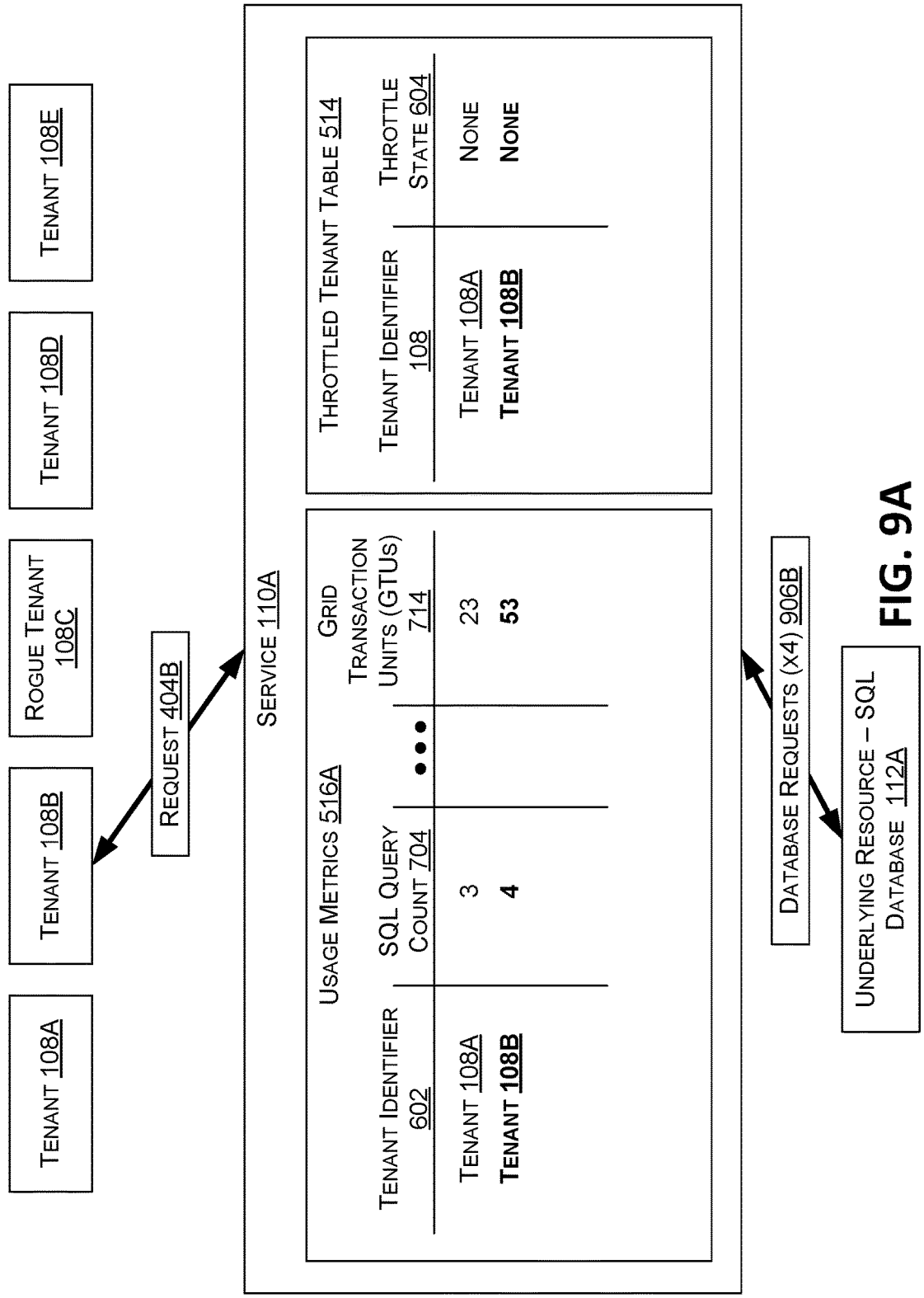
FIG. 9A is a block diagram illustrating the service receiving and processing a request from a second tenant.

FIG. 9A is a block diagram 900 illustrating service 110A receiving and processing request 404B from tenant 108B. Usage metrics 516A and throttled tenant table 514 are depicted after throttle checker component 510, request executor component 512, tenant workload tracker component 518 have processed request 404B and any metrics generated by processing request 404B. As depicted, request 404B may be received by service 110A and processed by throttle checker component 510. Throttle checker component 510 may consult throttled tenant table 514 to determine that tenant 108B does not have an entry, which is interpreted as tenant 108B having a throttle state of 'NONE'.

Accordingly, request executor component 512 proceeds to process request 404B, sending four database requests 906B to underlying resource 112A for processing. Results, including usage metrics, may be received by request executor component 512 and aggregated. In some configurations, when tenant 108B does not have a row 716 in usage metrics 516A, request executor component 512 adds the aggregated metrics to a new row 716. However, when tenant 108B does have an existing row 716 in usage metrics 516A, request executor component 512 adds the aggregated metrics from the four database requests 906B to the existing values associated with tenant 108B. As depicted, there was no previous row 716 in usage metrics 516A for tenant 108B, and so the aggregated metrics from the four database requests 906B are added as a new row 716 with a database query count 704 of four and a Grid Transaction Units (GTUs) 714 of '53'.

After request 404B has been processed, tenant workload tracker component 518 may query usage metrics 516A. In this example, tenant workload tracker component 518 may query usage metrics 516A and determine that neither tenant 108A nor tenant 108B have utilized underlying resource 112A enough to be throttled.

Figure 9B:
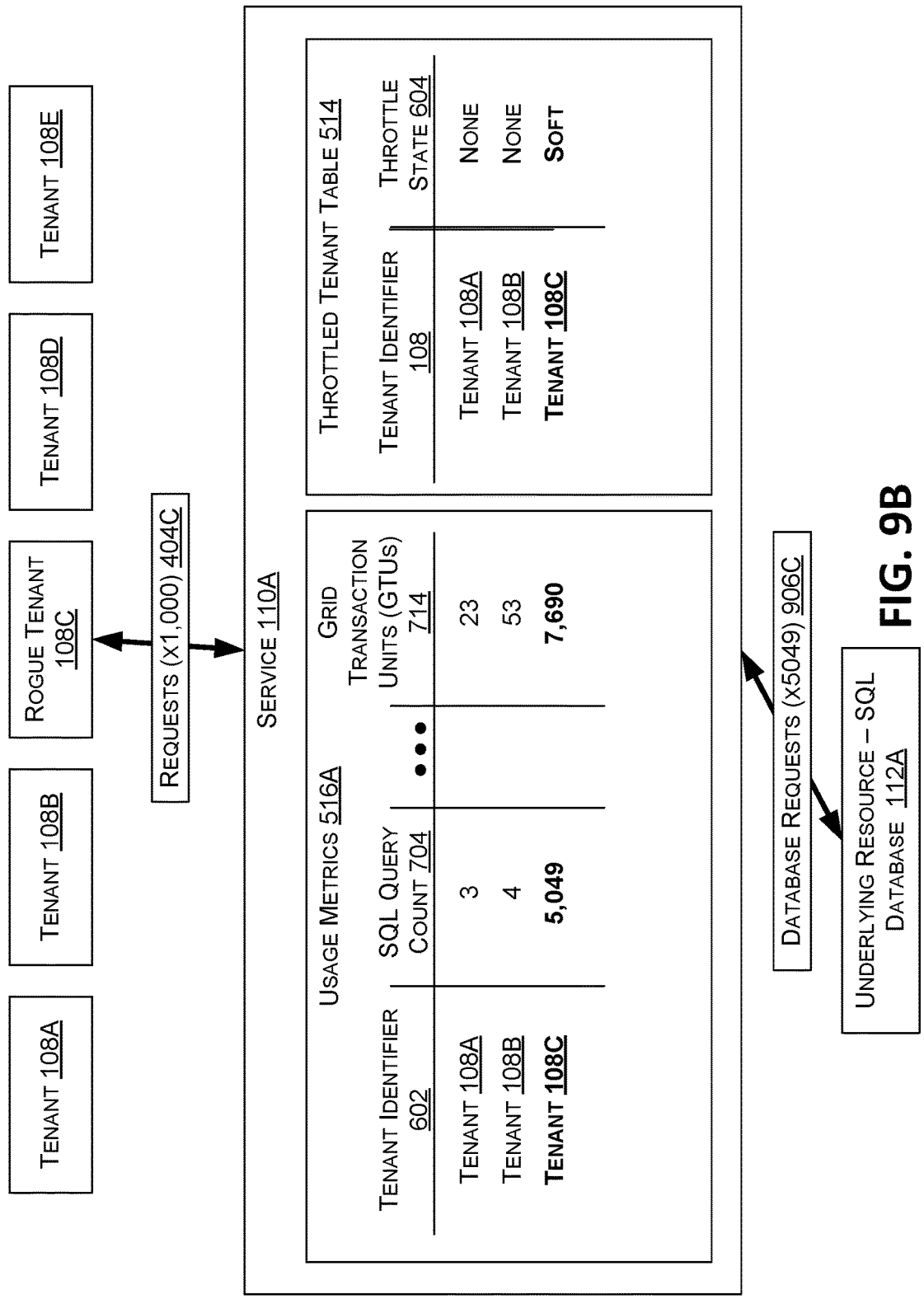
FIG. 9B is a block diagram illustrating the service receiving and processing 1,000 requests from a third tenant, during or after which the workload tracker has added the third tenant's throttle state to the throttled tenant table as 'SOFT'.

FIG. 9B is a block diagram 900 illustrating service 110A receiving and processing 1,000 requests 404C from overactive tenant 108C, during or after which tenant workload tracker component 518 has added the throttle state of tenant 108C to throttled tenant table 514 as 'SOFT'. In some configurations, FIG. 9B illustrates a similar process as FIG. 9A. However, as depicted in FIG. 9B, service 110A processes 1,000 requests, causing underlying resource 112A to process 5,049 database requests 906C.

In some configurations, the 1,000 requests 906C are received within a small enough time frame that tenant workload tracker component 518 soft-throttles tenant 108C. For example, tenant workload tracker component 518 may apply a request rate criteria to determine that tenant 108C has caused more than 500 request per minute to be sent to underlying resource 112A. However, in other embodiments, the 1,000 requests may be received and processed over enough time that the usage rate of underling resource 112A is not high enough to throttle tenant 108C.

Figure 9C:
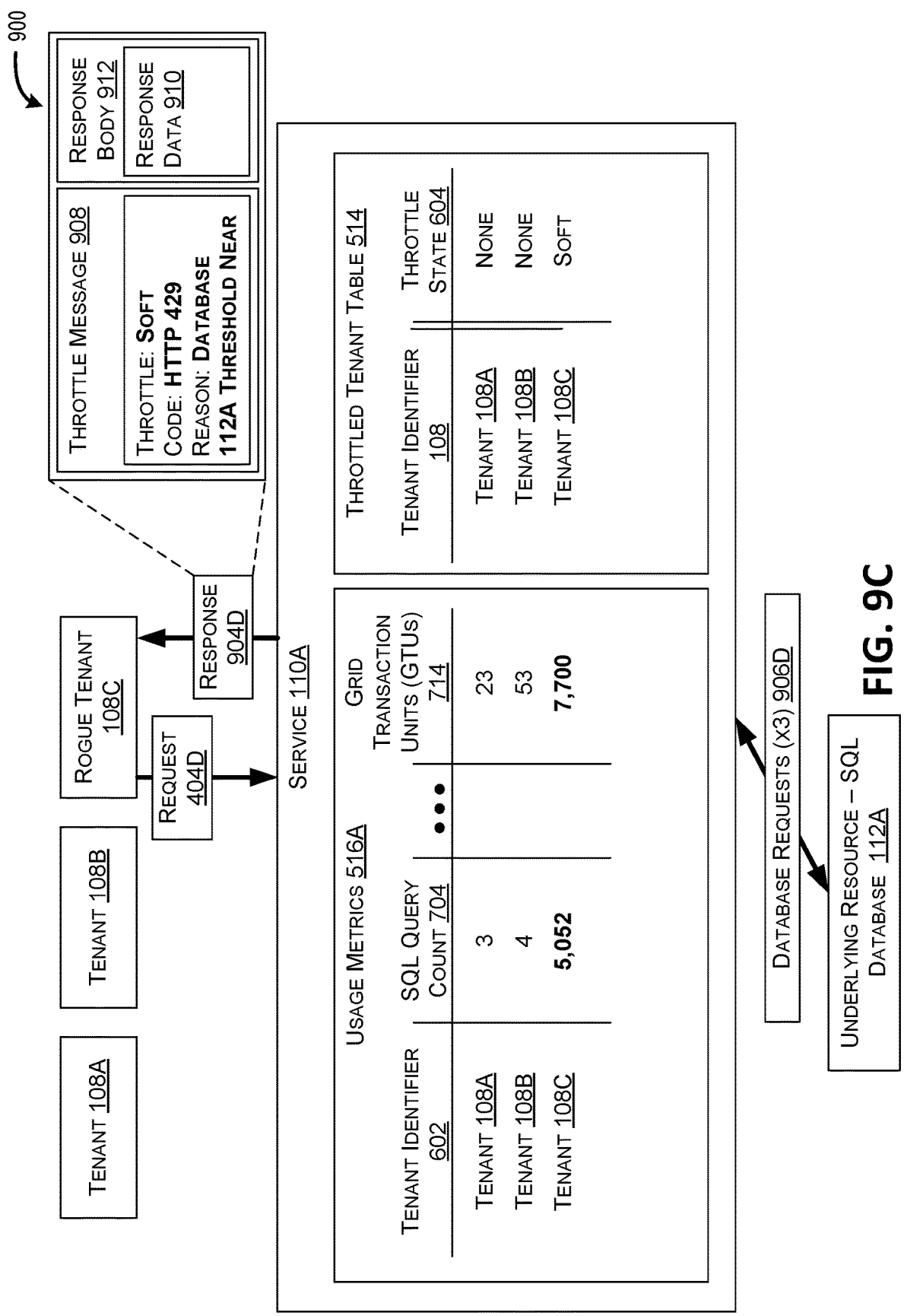
FIG. 9C is a block diagram illustrating the service receiving and processing a request from the third tenant in part by adding a soft throttle message to the response.

FIG. 9C is a block diagram 900 illustrating service 110A receiving and processing request 404D from tenant 108C. In some configurations, request 404D is the first request received since tenant 108C has been throttled.

In some configurations, Throttle checker component 510 queries throttled tenant table 514 and determines that tenant 108C has a throttle status of 'SLOW'. As a result, request executor component 512 processes request 404D as if tenant 108C was not throttled, with the exception that throttle message 908 will be added to response 904D. As such, request 404D causes service 110A to send three database requests 906D to underlying resource 112A. The results of the requested operations may include metrics used to update the tenant 108C row of usage metrics 516A. Specifically, Database query count 704 for tenant 108C may increase to 5,052, while GTUs 714 may increase to 7,700.

While generating response 904D to request 404D, request executor component 512 may include throttle message 908, indicating that tenant 108C is subject to a soft throttle. Throttle message 908 may include an error code (e.g. HTTP 429) recommending that computing devices associated with tenant 108C pause or slow down sending requests. Throttle message 908 may also indicate the usage threshold that triggered the soft throttle and the actual usage metric associated with tenant 108C. Throttle message 908 may also indicate a usage threshold that will trigger hard throttling. In some configurations, response body 912 of response 904D also includes response data 910, containing the results of request 404D.

Figure 9D:
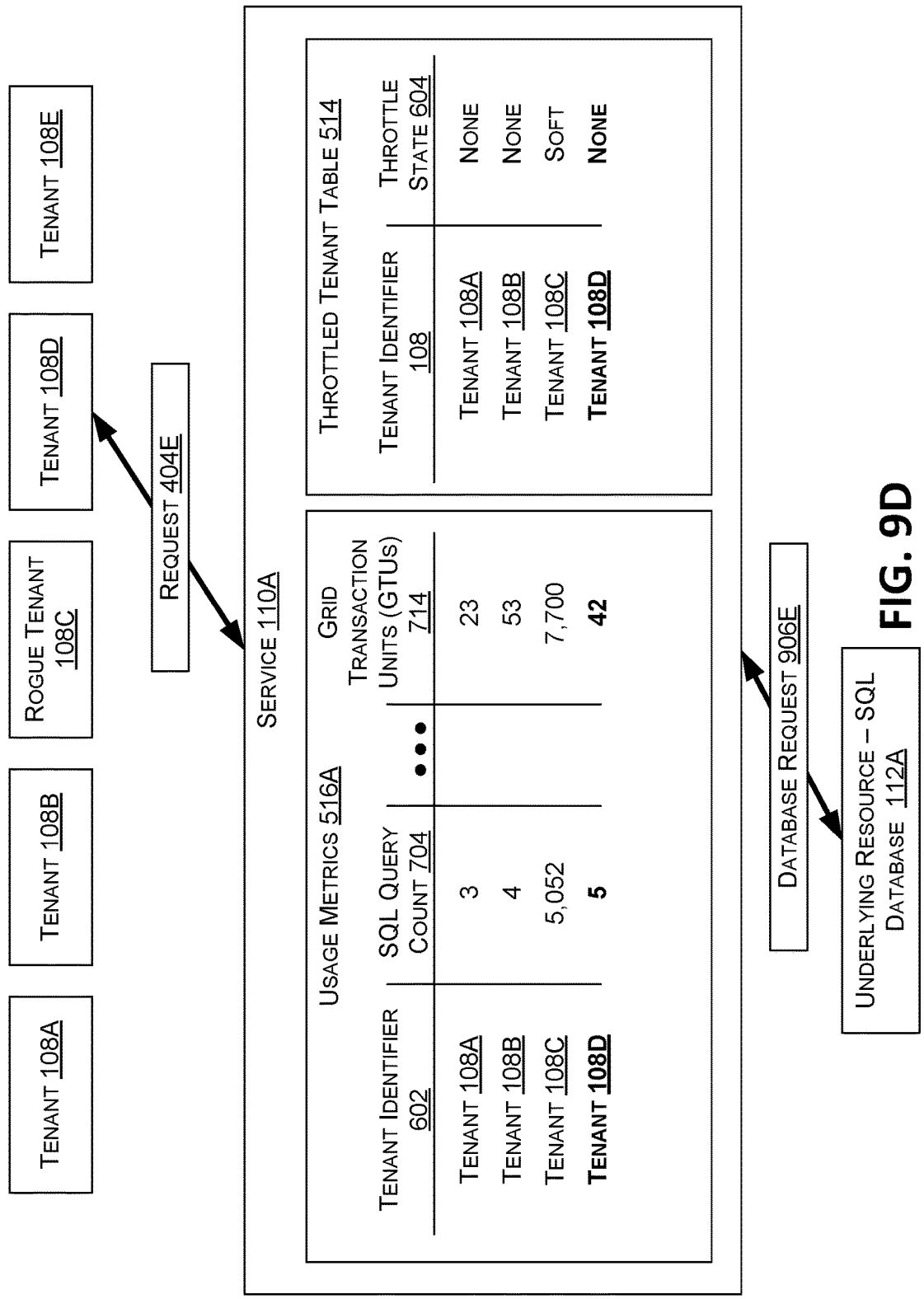
FIG. 9D is a block diagram illustrating the service receiving and processing a request from a fourth tenant.

FIG. 9D is a block diagram 900 illustrating service 110A receiving and processing request 404E from tenant 108D. In some configurations, request 404E from tenant 108D is processed similar to requests 404A and 404B—the request causes database request 906D to be performed by underlying resource 112A. Usage metrics associated with executing the requested operation 906D are incorporated into (i.e. added in a new row or used to update an existing row) usage metrics 516A. These operations are performed even though tenant 108C is soft-throttled.

Figure 9E:
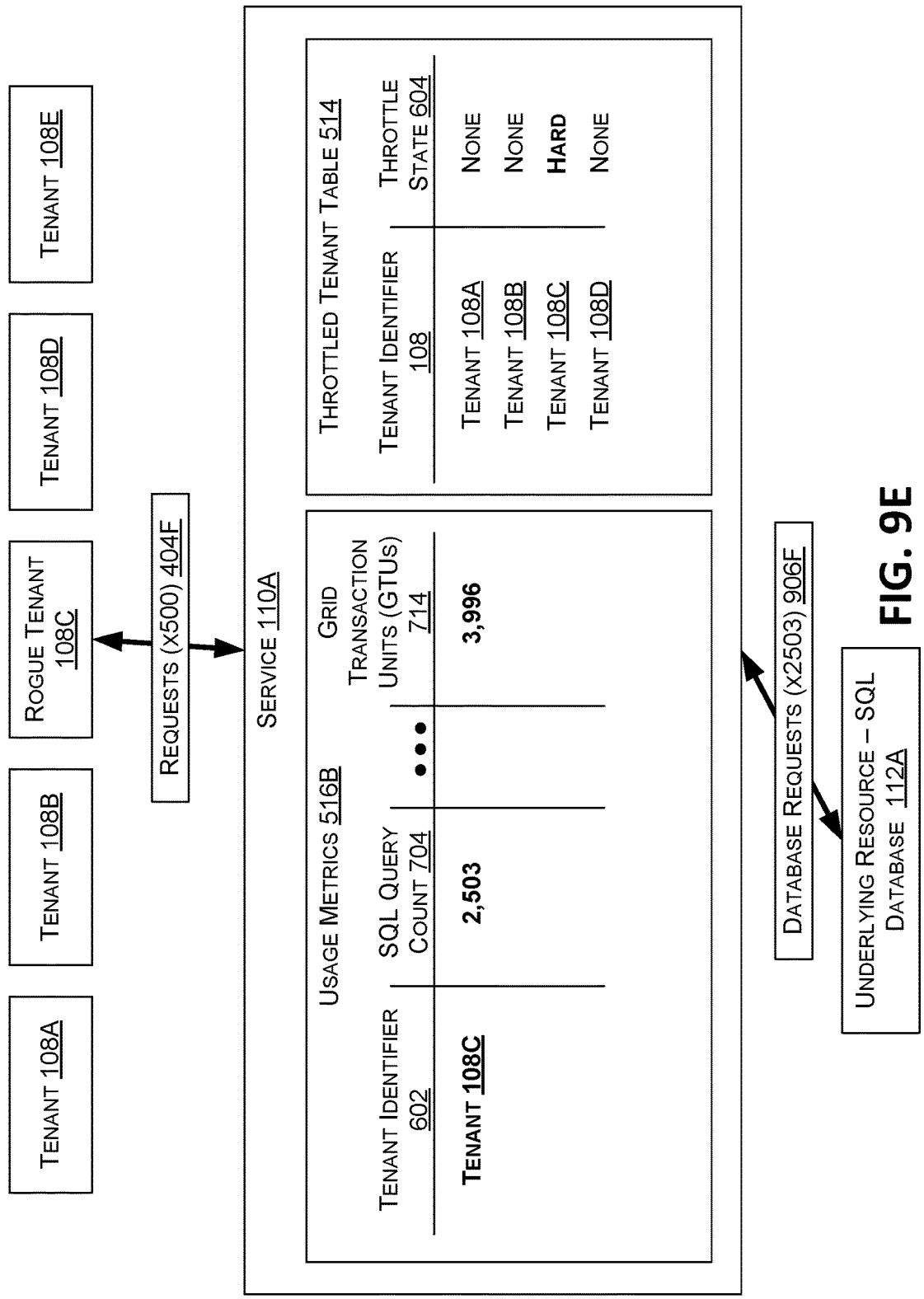
FIG. 9E is a block diagram illustrating the service receiving and processing 500 requests from the third tenant, during or after which the workload tracker has changed the third tenant's throttle state to 'HARD'.

FIG. 9E is a block diagram 900 illustrating service 110A receiving and processing 500 requests 404F from tenant 108C, during or after which tenant workload tracker component 518 has changed the throttle state of tenant 108C to 'HARD'. In some configurations, even though tenant 108C has already been soft-throttled, tenant 108C has elected to continue sending requests 404F.

In some configurations, requests 404F depicted in FIG. 9E may cause 2,503 database requests 906F to be performed by underlying resource 112A. Usage metrics captured while database operations 906F were being performed by underling resource 112A may be stored in usage metrics 516B. However, in other configurations, the captured usage metrics are stored in usage metrics table 516A.

As discussed briefly above, usage metrics tables may collect data from a defined period of time, e.g. over the course of two minutes. This allows tenant workload tracker component 518 to group metrics by time when determining whether usage has spiked, fallen off, etc. FIG. 9E depicts usage metrics from the 2,503 database operations are stored in usage metrics table 516B, indicating that the usage caused by requests 404F occurred in a different time frame than requests 404C.

Sometime after the 500 requests 404F have been processed by request executor component 512, tenant workload tracker component 518 may execute. Tenant workload tracker component 518 may query usage metrics from usage metrics tables 516A and 516B. In some configurations, usage metrics tables 516A and 516B contain usage metrics that fall within a look-back period, i.e. within a defined period of time deemed relevant for determining whether to throttle a tenant 108. In some configurations, the look-back period is defined in configuration settings 520. If usage metrics stored in usage metrics tables 516A were deemed to fall outside of the look-back period, they may not be included in the throttle analysis, and the result may be different.

As depicted in FIG. 9E, tenant workload tracker component 518 has determined that a request rate criteria has been met, i.e. more than a defined threshold of database requests have been submitted to underlying resource 112A in a defined period of time. As a result, tenant workload tracker component 518 has updated the entry for tenant 108C in throttled tenant table 514 to 'HARD', indicating that throttled tenant 108C is hard-throttled.

Figure 9F:
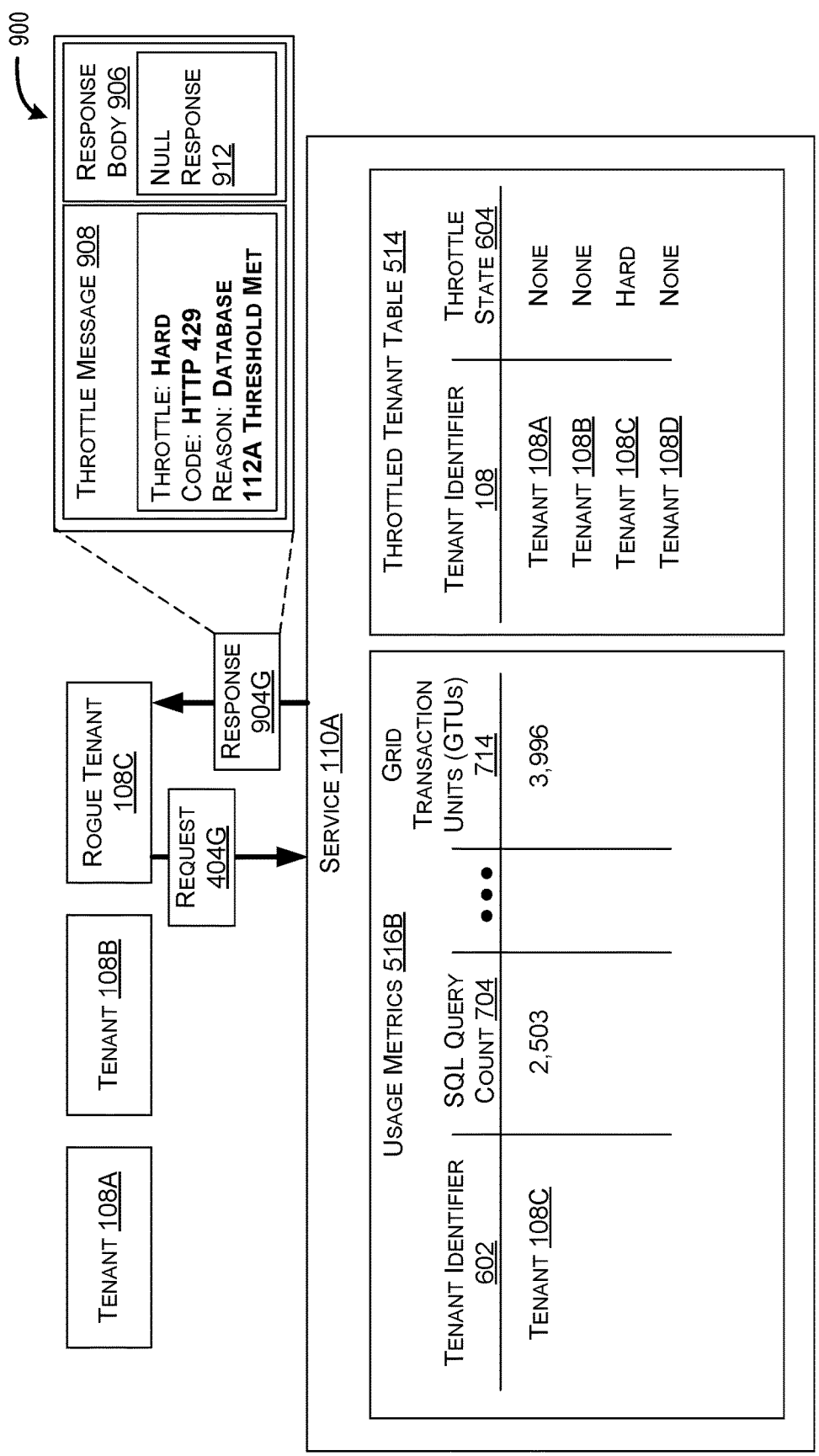
FIG. 9F is a block diagram illustrating the service rejecting a request from the third tenant based on the third tenant's 'HARD' throttle state.

FIG. 9F is a block diagram 900 illustrating service 110A rejecting request 404G from tenant 108C based on the 'HARD' throttle state of tenant 108C. In some configurations, request 404G is rejected with response 904G, which includes throttle message 908 indicating that tenant 108C is hard throttled, the reason tenant 108C is hard throttled, and/or an HTTP error code. Additionally, or alternatively, response 904G may include a response body 906 that includes a null response 912.

Figure 10:
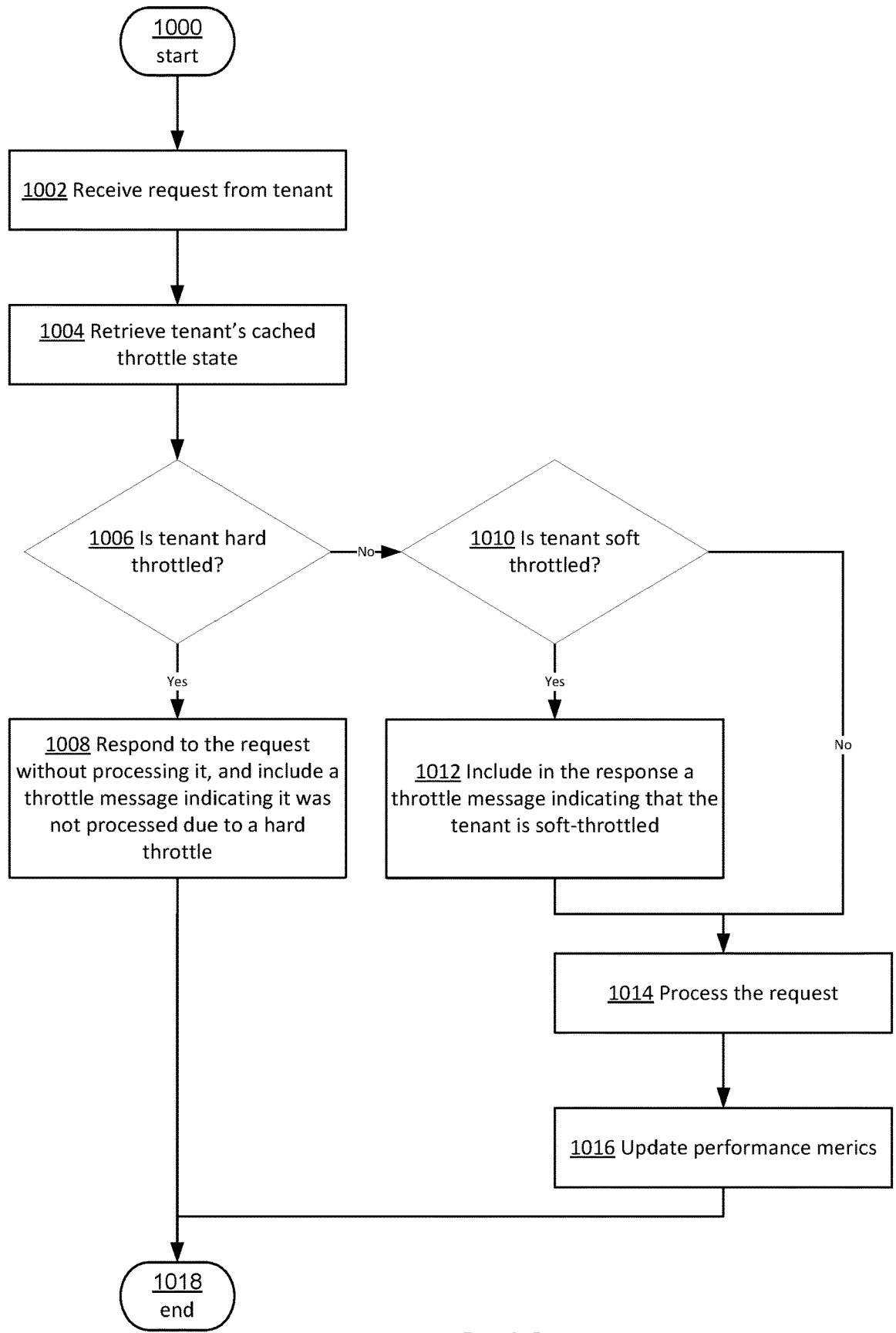
FIG. 10 is a flow diagram illustrating an example operational procedure according to the described implementations.

FIG. 10 is a flow diagram illustrating an example routine 1000 performed by request processor 502 for determining if and how to throttle a request according to the described implementations. Referring to FIG. 10, operation 1000 begins the procedure.

From operation 1000, the routine 1000 proceeds to operation 1002, where request processor 502 receives a request 404A from a tenant 108A. Responsive to the receipt of the request 404A from the tenant 108A, the routine 1000 proceeds from operation 1002 to operation 1004. At operation 1004, the throttle checker component 510 retrieves a cached throttle state 604 of the tenant 108A from throttled tenant table 514.

Responsive to the receipt of the cached throttle state 604 from throttled tenant table 514, the routine 1000 proceeds from operation 1004 to operation 1006, where throttle checker component 510 uses cached throttle state 604 to determine if tenant 108A is hard-throttled. If throttle checker component 510 determines that tenant 108A is hard-throttled, the routine 1000 proceeds from operation 1006 to operation 1008, where request executor component 512 responds to request 404A without processing the request, and wherein the response 904G includes a throttle message 908 indicating that the request 404A was not processed due to tenant 108A being hard throttled. Responsive to no responding to the request 404A, the routine 1000 proceeds from operation 1008 to operation 1018, where it ends.

However, if throttle checker component 510 determines that tenant 108A is not hard-throttled, the routine 1000 proceeds from operation 1006 to 1010, where throttle checker component 510 uses cached throttle state 604 to determine if tenant 108A is soft-throttled. If throttle checker component 510 determines that tenant 108A is soft-throttled, the routine 1000 proceeds from operation 1010 to operation 1012, where request executing component 512 adds a throttle message 908 to response 904D indicating that tenant 108A is soft throttled.

Responsive to throttle checker component 510 determining that tenant 108A is not soft-throttled, or responsive to request executing component 512 adding a throttle message 908 to response 904D, the routine 1000 proceeds from either operation 1010 or operation 1012 to operation 1014. At operation 1014, request executor component 512 processes request 404A.

Responsive to request executor component 512 processing request 404A, the routine proceeds from operation 1014 to operation 1016, where request executor component 512 updates usage metrics 516. In some configurations, usage metrics 516 are updated with an amount of resources used by underlying resource 112A to process requests 906, where requests 906 were sent by service 110A to underlying resource 112A while processing request 404A. Responsive to request executor component 512 updating usage metrics 516, the routine 1000 proceeds from operation 1016 to operation 1018, where it ends.

Figure 11:
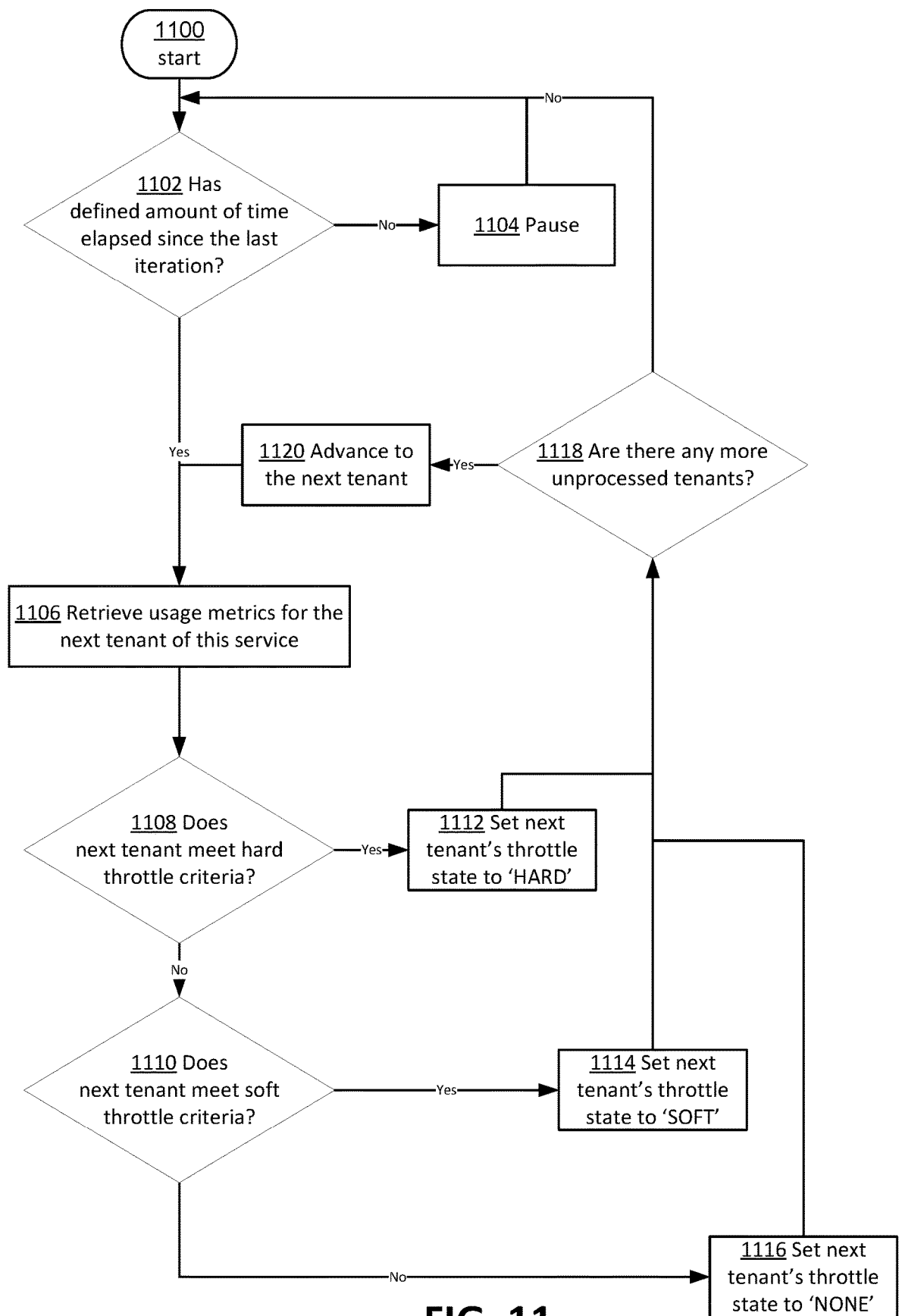
FIG. 11 is a flow diagram illustrating an example operational procedure according to the described implementations.

FIG. 11 is a flow diagram illustrating an example routine 1100 performed by tenant workload tracker component 518 for setting a tenant's throttle state based on an analysis of usage metrics 516. Referring to FIG. 11, operation 1100 begins the procedure.

From operation 1100, the routine 1100 proceeds to operation 1102, where tenant workload tracker component 518 determines if a defined amount of time has elapsed since the last iteration of tenant workload tracker component 518. If tenant workload tracker component 518 determines that a defined amount of time has not elapsed since the last iteration of tenant workload tracker component 518, the routine 1100 proceeds from operation 1102 to operation 1104, where tenant workload tracker component 518 pauses. Tenant workload tracker component 518 may pause until it is triggered again, e.g. by a timer event, by a spike in usage from a particular tenant, etc. After pausing, the routine 1100 proceeds from operation 1104 to operation 1102.

However, if tenant workload tracker component 518 determines that a defined amount of time has elapsed since the last iteration of tenant workload tracker component 518, the routine 1100 proceeds from operation 1102 to operation 1106, where tenant workload tracker component 518 retrieves usage metrics for a next tenant 108A from usage metrics 516.

Responsive to retrieving usage metrics for the next tenant 108A, the routine 1100 proceeds from operation 1106 to operation 1108, where tenant workload tracker component 518 determines, based on the usage metrics retrieved in operation 1106, if the next tenant 108A meets a hard throttle criteria. If the next tenant 108A does meet a hard throttle criteria, the routine 1100 proceeds from operation 1108 to operation 1112, where tenant workload tracker component 518 sets the next tenant's throttle state in throttled tenant table 514 to 'HARD'.

Responsive to tenant workload tracker component 518 setting the next tenant's throttle state in throttled tenant table 514 to 'HARD', the routine 1100 proceeds from operation 1112 to operation 1118, where tenant workload tracker component 518 determines if there are any unprocessed tenants in usage metrics 516. If tenant workload tracker component 518 determines that there are unprocessed tenants in usage metrics 516, the routine 1100 proceeds from operation 1118 to operation 1120, where tenant workload tracker component 518 advances to the next tenant in usage metrics 516. Responsive to advancing to the next tenant in usage metrics 516, the routine 1100 proceeds from operation 1120 to operation 1106.

Responsive to tenant workload tracker component 518 determining that there are no unprocessed tenants in usage metrics 516, the routine 1100 proceeds from operation 1118 to operation 1102.

Responsive to tenant workload tracker component 518 determining that the next tenant 108A does not meet a hard throttle criteria, the routine 1100 proceeds from operation 1108 to operation 1110, where tenant workload tracker component 518 determines if the next tenant 108A meets a soft throttle criteria. If tenant workload tracker component 518 determines that the next tenant 108A does meet a soft throttle criteria, the routine 1100 proceeds from operation 1110 to operation 1114, where tenant workload tracker component 518 sets the next tenant's throttle state in the throttled tenant table 514 to 'SOFT'. Responsive to tenant workload tracker component 518 setting the next tenant's throttle state in the throttled tenant table 514 to 'SOFT', routine 1100 proceeds from operation 1114 to operation 1118.

However, if tenant workload tracker component 518 determines that the next tenant 108A does not meet a soft throttle criteria, the routine 1100 proceeds from operation 1110 to operation 1116, where tenant workload tracker component 518 sets the next tenant's throttle state in the throttled tenant table 514 to 'NONE'. Responsive to tenant workload tracker component 518 setting the next tenant's throttle state in the throttled tenant table 514 to 'NONE', the routine 1100 proceeds from operation 1116 to operation 1118.

Under normal operation, routine 1100 does not have an expected endpoint, and instead operates indefinitely until an error occurs, the computing device that tenant workload tracker component 518 is running on loses power, a human operation intervenes to exit the loop, or the like.

It should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Figure 12:
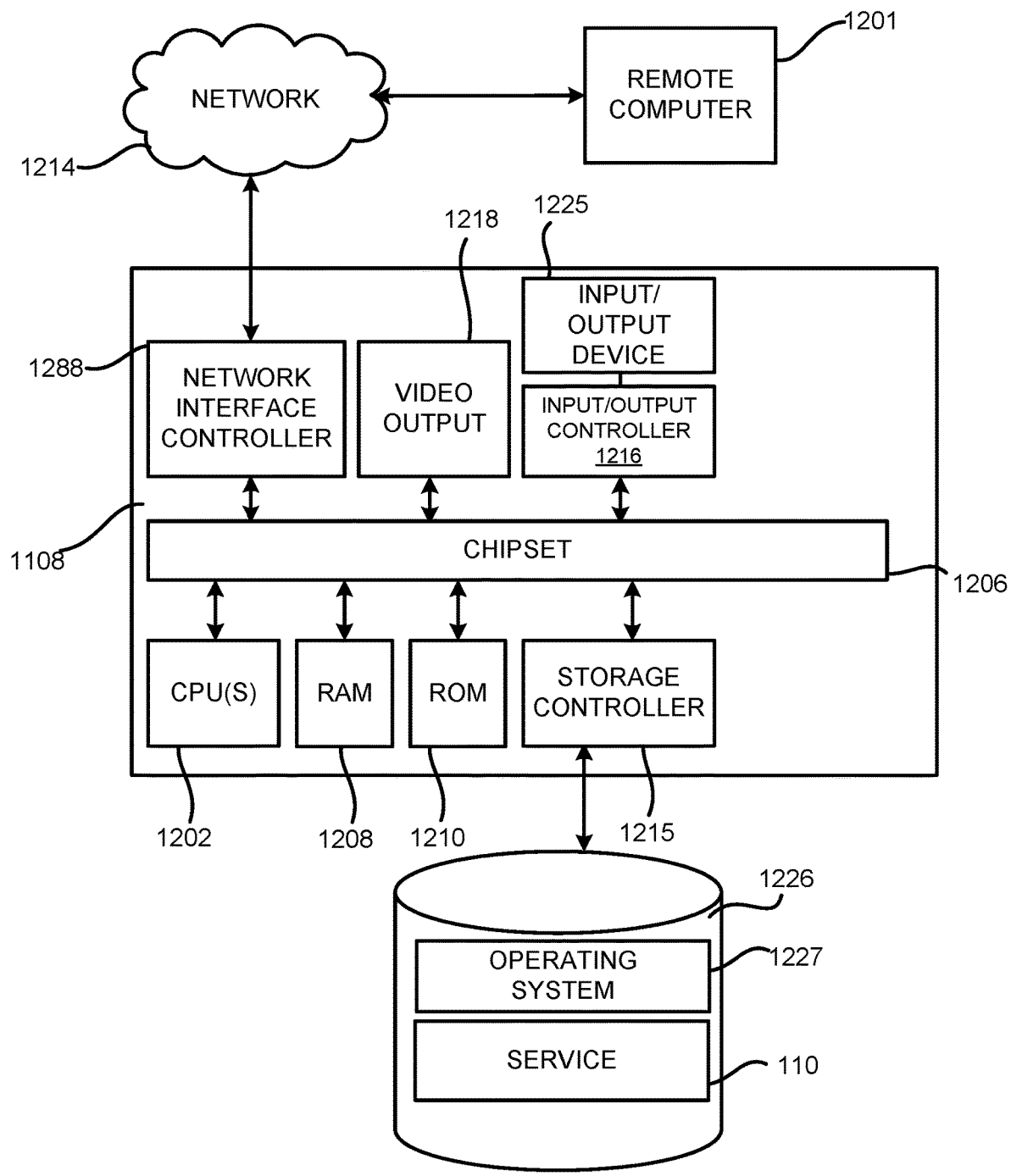
FIG. 12 is a computer architecture diagram illustrating a computing device architecture for a computing device capable of implementing aspects of the techniques and technologies presented herein.

Although FIG. 12 refers to the components of FIG. 1-11, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

FIG. 12 shows additional details of an example computer architecture capable of various aspects of the embodiments described above. The computer architecture shown in FIG. 12 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 12 may be utilized to execute any of the software components described above.

The computer architecture includes a baseboard 1202, or "motherboard," which is a printed circuit board to which a multitude of components or devices may be connected by way of a system bus or other electrical communication paths. In one illustrative embodiment, one or more central processing units (CPUs) 1204 operate in conjunction with a chipset 1206. The CPUs 1204 may be standard programmable processors that perform arithmetic and logical operations necessary for the operation of the computer architecture.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer architecture. The chipset 1206 may further provide an interface to a computer-readable storage medium such as a read-only memory (ROM) 1210 or non-volatile RAM (NVRAM) for storing basic routines that help to startup the computing device and to transfer information between the various components and devices. The ROM 1210 or NVRAM may also store other software components necessary for the operation of the computer architecture in accordance with the embodiments described herein.

The computer architecture may operate in a networked environment using logical connections to remote computing devices and computer systems through a network 1214, such as the local area network. The chipset 1206 may include functionality for providing network connectivity through a network interface controller (NIC) 1288, such as a gigabit Ethernet adapter. The NIC 1288 is capable of connecting the computer architecture to other computing devices over the network 1214. It should be appreciated that multiple NICs 1288 may be present in the computer architecture, connecting the computer to other types of networks and remote computer systems. The network allows the computer architecture to communicate with remote services and servers, such as the remote computer 1201. As can be appreciated, the remote computer 1201 may be any computing device, such as a server computing device that is part of one of server farms 102.

The computer architecture may be connected to a mass storage device 1226 that provides non-volatile storage for the computing device. The mass storage device 1226 may store system programs, application programs, other program modules, and data, which have been described in greater detail herein. The mass storage device 1226 may be connected to the computer architecture through a storage controller 1215 connected to the chipset 1206. The mass storage device 1226 may consist of one or more physical storage units. The storage controller 1215 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 1226, other storage media and the storage controller 1215 may include MultiMediaCard (MMC) components, eMMC components, Secure Digital (SD) components, PCI Express components, or the like.

The computer architecture may store data on the mass storage device 1226 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1226 is characterized as primary or secondary storage, and the like.

For example, the computer architecture may store information to the mass storage device 1226 by issuing instructions through the storage controller 1215 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 1226 by detecting the physical states or characteristics of one or more particular locations within the physical storage units.

In addition to the mass storage device 1226 described above, the computer architecture may have access to other computer-readable media to store and retrieve information, such as program modules, data structures, or other data. As the operating system 1227, the services 110, other data and other modules are depicted as data and software stored in the mass storage device 1226, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 1226 may store an operating system 1227 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, or iOS operating systems, available from their respective manufacturers. It should be appreciated that other operating systems may also be utilized. The mass storage device 1226 may store other system or application programs and data utilized by the computer architecture, such as any of the other software components and data described above. The mass storage device 1226 might also store other programs and data not specifically identified herein.

In one embodiment, the mass storage device 1226 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 1204 transition between states, as described above. According to one embodiment, the computer architecture has access to computer-readable storage media storing computer-executable instructions which, when executed by the computer architecture, perform the various routines described above with regard to FIG. 12, and the other FIGS. The computing device might also include computer-readable storage media for performing any of the other computer-implemented operations described herein.

The computer architecture may also include one or more input/output controllers 1216 for receiving and processing input from a number of input devices, such as a keyboard, a mouse, a microphone, a headset, a touchpad, a touch screen, an electronic stylus, image processing and gesture recognition devices, or any other type of input device. The input/output controller 1216 is in communication with an input/output device 1225. The input/output controller 1216 may provide output to a display, such as a computer monitor, a flat-panel display, a digital projector, a printer, a plotter, or other type of output device. The input/output controller 1216 may provide input communication with other devices such as a microphone, a speaker, game controllers and/or audio devices.

For example, the input/output controller 1216 can be an encoder and the input/output device 1225 can include a full speaker system having a plurality of speakers. The encoder can use a spatialization technology, and the encoder can process audio output audio or output signals received from the application 1229. The encoder can utilize a selected spatialization technology to generate a spatially encoded stream that appropriately renders to the input/output device 1225.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The disclosure presented herein may be considered in view of the following clauses.

Example 1

A computer-implemented method for throttling requests sent from a tenant computing device to a multi-tenant service, wherein the tenant computing device is associated with an overactive tenant of a distributed computing application, the computer-implemented method comprising: receiving a plurality of requests from a plurality of tenant computing devices associated with a plurality of tenants; processing the plurality of requests, wherein processing the plurality of requests comprises sending a second plurality of requests to an underlying resource; determining a resource usage of the underlying resource attributed to each of the plurality of tenants by determining one or more usage metrics of the underlying resource caused by each of the second plurality of requests and aggregating the one or more usage metrics for each of the plurality of tenants; identifying an overactive tenant of the plurality of tenants by determining that a resource usage of the underlying resource attributed to the overactive tenant meets one or more overactive tenant criteria; receiving a request from the tenant computing device associated with the overactive tenant; and throttling the request, wherein throttling the request comprises including a throttle message in a response to the received request.

Example 2

The computer-implemented method of Example 1, wherein the overactive tenant criteria are associated with soft-throttling, wherein throttling the request comprises soft-throttling the request, and wherein soft-throttling the request includes processing the request and indicating in the throttle message that requests from the overactive tenant are being soft-throttled.

Example 3

The computer-implemented method of Example 2, wherein the throttle message comprises data that identifies which overactive tenant criteria was met.

Example 4

The computer-implemented method of Example 2, wherein the throttle message comprises data identifying the underlying resource, a usage threshold that is part of the overactive tenant criteria and that was exceeded by requests associated with the overactive tenant, and an amount by which the usage threshold was exceeded.

Example 5

The computer-implemented method of Example 1, further comprising processing a request from the plurality of requests when the request of the plurality of requests is not associated with the overacting tenant.

Example 6

The computer-implemented method of Example 1, wherein requests of the second plurality of requests are identified by intercepting calls to a client library that invokes the underlying resource.

Example 7

The computer-implemented method of Example 1, wherein the underlying resource comprises a database, a distributed memory cache, a hosted compute resource, a hosted storage resource, or a hosted communication resource.

Example 8

A computer-readable storage medium having computer-executable instructions stored thereupon which, when executed by a processor, cause the processor to: receive a plurality of requests from a plurality of tenant computing devices associated with a plurality of tenants; process the plurality of requests in part by sending a second plurality of requests to an underlying resource; determine a resource usage of the underlying resource attributed to each of the plurality of tenants by determining one or more usage metrics of the underlying resource caused by each of the second plurality of requests and aggregating the one or more usage metrics associated with each of the plurality of tenants, wherein the one or more usage metrics are determined from responses to the second plurality of requests;

identify an overactive tenant of the plurality of tenants by determining that a resource usage of the underlying resource attributed to the overactive tenant meets one or more overactive tenant criteria; receive a request from the tenant computing device associated with the overactive tenant; and throttle the request, wherein throttling the request comprises including a throttle message in a response to the received request.

Example 9

The computer-readable storage medium of Example 8, having further computer-executable instructions stored thereupon to retrieve a load metric from the underlying resource, wherein a defined usage threshold used to determine if one of the one or more overactive tenant criteria has been met is lowered when the retrieved load metric is high.

Example 10

The computer-readable storage medium of Example 8, wherein a defined usage threshold used to determine if one of the one or more overactive tenant criteria has been met is based on an average usage of the underlying resource caused by the plurality of tenants.

Example 11

The computer-readable storage medium of Example 8, wherein the usage metrics are aggregated by a request type, and wherein requests associated with the overactive tenant are throttled differently based on request type.

Example 12

The computer-readable storage medium of Example 8, wherein the usage metrics are retrieved and analyzed by different thread of the multi-tenant service than a thread that receives requests and processes them.

Example 13

The computer-readable storage medium of Example 8, wherein throttling the request includes hard-throttling the request, and wherein hard-throttling the request includes not processing the request and returning a response to the request indicating that associated with the overacting tenant will be hard-throttled.

Example 14

The computer-readable storage medium of Example 8, wherein a defined usage threshold used to determine if one of the one or more overactive tenant criteria has been met comprises a number of exceptions thrown by the underlying resource over a defined period of time caused by the overactive tenant, and wherein a tenant exceeds the usage threshold when the tenant causes the underlying resource to throw more than the usage threshold in the defined period of time.

Example 15

A computing device, comprising: one or more processors; and at least one computer storage media having computer-executable instructions stored thereupon which, when executed by the one or more processors, will cause the computing device to: receive a plurality of requests from a plurality of tenant computing devices associated with a plurality of tenants; process the plurality of requests in part by sending a second plurality of requests to an underlying resource; determine a resource usage of the underlying resource attributed to each of the plurality of tenants by determining one or more usage metrics of the underlying resource caused by each of the second plurality of requests and aggregating the one or more usage metrics associated with each of the plurality of tenants; identify an overactive tenant of the plurality of tenants by determining that a resource usage of the underlying resource attributed to the overactive tenant meets one or more overactive tenant criteria; determine, based on which of the one or more overactive tenant criteria the overactive tenant met, whether to soft-throttle or hard-throttle requests associated with the overactive tenant; store in a throttled tenant table a throttle state indicating whether the overactive tenant is soft-throttled or hard-throttled; receive a request from a tenant computing device associated with the overactive tenant; apply a slow throttle or a hard throttle based on the throttle state.

Example 16

The computing device of Example 15, wherein the underlying resource comprises a database, wherein the resource usage of the underlying resource attributed to each of the plurality of tenants is stored in a usage metrics table, and wherein the usage metrics table includes a query count, a query execution time, or a number of outgoing network connections caused to be opened by requests associated with the overactive tenant.

Example 17

The computing device of Example 15, wherein the resource usage of the underlying resource attributed to each of the plurality of tenants is stored in a usage metrics table, and wherein the throttle state is computed in part based on a composite metric derived from a plurality of metrics in the usage metrics table.

Example 18

The computing device of Example 15, wherein the throttle state of the overactive tenant is calculated in part based on usage metrics caused to other underlying resources by the overactive tenant.

Example 19

The computing device of Example 15, wherein the resource usage of the underlying resource attributed to each of the plurality of tenants is stored in a usage metrics table, and wherein the throttle state is periodically updated by a tenant tracker component that evaluates usage metrics in the usage metrics table.

Example 20

The computing device of Example 19, wherein the usage metrics table is updated based on usage metrics of the underlying resource caused by additional requests from the plurality of tenant computing devices associated with the plurality of tenants.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for throttling requests sent from a tenant computing device to a multi-tenant service, wherein the tenant computing device is associated with an overactive tenant of a distributed computing application, the computer-implemented method comprising:
   receiving a plurality of requests from a plurality of tenant computing devices associated with a plurality of tenants;
   processing the plurality of requests, wherein processing the plurality of requests comprises sending a second plurality of requests to an underlying resource;
   determining a resource usage of the underlying resource attributed to each of the plurality of tenants by determining one or more usage metrics of the underlying resource caused by each of the second plurality of requests and aggregating the one or more usage metrics for each of the plurality of tenants;
   identifying a tenant of the plurality of tenants as the overactive tenant of the distributed computing application by determining that a resource usage of the underlying resource attributed to the tenant of the plurality of tenants meets one or more overactive tenant criteria;
   receiving a request from the tenant computing device associated with the overactive tenant of the distributed computing application; and
   throttling the request, wherein throttling the request comprises including a throttle message in a response to the received request.

2. The computer-implemented method of claim 1, wherein the overactive tenant criteria are associated with soft-throttling, wherein throttling the request comprises soft-throttling the request, and wherein soft-throttling the request includes processing the request and indicating in the throttle message that requests from the overactive tenant of the distributed computing application are being soft-throttled.

3. The computer-implemented method of claim 2, wherein the throttle message comprises data that identifies which overactive tenant criteria was met.

4. The computer-implemented method of claim 2, wherein the throttle message comprises data identifying the underlying resource, a usage threshold that is part of the overactive tenant criteria and that was exceeded by requests associated with the overactive tenant of the distributed computing application, and an amount by which the usage threshold was exceeded.

5. The computer-implemented method of claim 1, further comprising processing a request from the plurality of requests when the request of the plurality of requests is not associated with the overacting tenant.

6. The computer-implemented method of claim 1, wherein requests of the second plurality of requests are identified by intercepting calls to a client library that invokes the underlying resource.

7. The computer-implemented method of claim 1, wherein the underlying resource comprises a database, a distributed memory cache, a hosted compute resource, a hosted storage resource, or a hosted communication resource.

8. The computer-implemented method of claim 1, wherein the plurality of requests are received by a service, wherein the service sends the second plurality of request to the underlying resource, and wherein a request of the plurality of requests is processed in part by the service generating one or more requests of the second plurality of requests.

9. A computer-readable storage medium having computer-executable instructions stored thereupon which, when executed by a processor, cause the processor to:
   receive a plurality of requests from a plurality of tenant computing devices associated with a plurality of tenants;
   process the plurality of requests in part by sending a second plurality of requests to an underlying resource;
   determine a resource usage of the underlying resource attributed to each of the plurality of tenants by determining one or more usage metrics of the underlying resource caused by each of the second plurality of requests and aggregating the one or more usage metrics associated with each of the plurality of tenants, wherein the one or more usage metrics are determined from responses to the second plurality of requests;
   identify an overactive tenant of the plurality of tenants by determining that the resource usage of the underlying resource attributed to the overactive tenant meets one or more overactive tenant criteria;
   receive a request from a tenant computing device associated with the overactive tenant; and
   throttle the request, wherein throttling the request comprises including a throttle message in a response to the received request.

10. The computer-readable storage medium of claim 9, having further computer-executable instructions stored thereupon to retrieve a load metric from the underlying resource, wherein a defined usage threshold used to determine if one of the one or more overactive tenant criteria has been met is lowered when the retrieved load metric is high.

11. The computer-readable storage medium of claim 9, wherein a defined usage threshold used to determine if one of the one or more overactive tenant criteria has been met is based on an average usage of the underlying resource caused by the plurality of tenants.

12. The computer-readable storage medium of claim 9, wherein the usage metrics are aggregated by a request type, and wherein requests associated with the overactive tenant are throttled differently based on request type.

13. The computer-readable storage medium of claim 9, wherein throttling the request includes hard-throttling the request, and wherein hard-throttling the request includes not processing the request and returning a response to the request indicating that associated with the overacting tenant will be hard-throttled.

14. The computer-readable storage medium of claim 9, wherein a defined usage threshold used to determine if one of the one or more overactive tenant criteria has been met comprises a number of exceptions thrown by the underlying resource over a defined period of time caused by the overactive tenant, and wherein a tenant exceeds the usage threshold when the tenant causes the underlying resource to throw more than the usage threshold in the defined period of time.

15. A computing device, comprising:
one or more processors; and
at least one computer storage media having computer-executable instructions stored thereupon which, when executed by the one or more processors, will cause the computing device to:
receive a plurality of requests from a plurality of tenant computing devices associated with a plurality of tenants;
process the plurality of requests in part by sending a second plurality of requests to an underlying resource;
determine a resource usage of the underlying resource attributed to each of the plurality of tenants by determining one or more usage metrics of the underlying resource caused by each of the second plurality of requests and aggregating the one or more usage metrics associated with each of the plurality of tenants;
identify an overactive tenant of the plurality of tenants by determining that the resource usage of the underlying resource attributed to the overactive tenant meets one or more overactive tenant criteria;
determine, based on which of the one or more overactive tenant criteria the overactive tenant met, whether to soft-throttle or hard-throttle requests associated with the overactive tenant;
store in a throttled tenant table a throttle state indicating whether the overactive tenant is soft-throttled or hard-throttled;
receive a request from a tenant computing device associated with the overactive tenant;
apply a slow throttle or a hard throttle based on the throttle state.

16. The computing device of claim 15, wherein the underlying resource comprises a database, wherein the resource usage of the underlying resource attributed to each of the plurality of tenants is stored in a usage metrics table, and wherein the usage metrics table includes a query count, a query execution time, or a number of outgoing network connections caused to be opened by requests associated with the overactive tenant.

17. The computing device of claim 15, wherein the resource usage of the underlying resource attributed to each of the plurality of tenants is stored in a usage metrics table, and wherein the throttle state is computed in part based on a composite metric derived from a plurality of metrics in the usage metrics table.

18. The computing device of claim 15, wherein the throttle state of the overactive tenant is calculated in part based on usage metrics caused to other underlying resources by the overactive tenant.

19. The computing device of claim 15, wherein the resource usage of the underlying resource attributed to each of the plurality of tenants is stored in a usage metrics table, and wherein the throttle state is periodically updated by a tenant tracker component that evaluates usage metrics in the usage metrics table.

20. The computing device of claim 19, wherein the usage metrics table is updated based on usage metrics of the underlying resource caused by additional requests from the plurality of tenant computing devices associated with the plurality of tenants.

* * * * *